US012707136B2

(12) United States Patent
Mun et al.

(10) Patent No.: US 12,707,136 B2
(45) Date of Patent: Aug. 11, 2026

(54) IMAGE SENSOR AND ELECTRONIC APPARATUS INCLUDING THE IMAGE SENSOR

(71) Applicant: SAMSUNG ELECTRONICS CO., LTD., Suwon-si (KR)

(72) Inventors: Sangeun Mun, Suwon-si (KR); Hyunsung Park, Suwon-si (KR); Sungmo Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 18/908,109

(22) Filed: Oct. 7, 2024

(65) Prior Publication Data

US 2025/0175688 A1 May 29, 2025

(30) Foreign Application Priority Data

Nov. 28, 2023 (KR) ........................ 10-2023-0168239

(51) Int. Cl.
*H04N 23/55* (2023.01)
*G02B 3/00* (2006.01)
(Continued)

(52) U.S. Cl.
CPC ........... *H04N 23/55* (2023.01); *G02B 3/0037* (2013.01); *G02B 5/202* (2013.01); *G02B 2207/101* (2013.01); *H04N 25/134* (2023.01)

(58) Field of Classification Search
CPC ...... H04N 23/55; H04N 25/134; H04N 25/00; G02B 3/0037; G02B 5/202;
(Continued)

(56) References Cited

U.S. PATENT DOCUMENTS 7,667,286 B2 2/2010 Toshikiyo et al.
2017/0179180 A1 6/2017 Kim
(Continued)

FOREIGN PATENT DOCUMENTS

CN 109273469 A 1/2019
EP 4 120 347 A1 1/2023
(Continued)

OTHER PUBLICATIONS

U.S. Appl. No. 63/549,900 by Kress et al. (Year: 2023).*
Communication issued Mar. 13, 2025 by the European Patent Office in European Patent Application No. 24209701.2.

*Primary Examiner* — Shahbaz Nazrul
(74) *Attorney, Agent, or Firm* — Sughrue Mion, PLLC

(57) ABSTRACT

An image sensor includes a sensor substrate including a plurality of pixels sensing incident light, a nano-optical micro-lens array including a plurality of nano-optical micro-lenses respectively corresponding to the plurality of pixels, and a color filter array disposed between the sensor substrate and the nano-optical micro-lens array and including a plurality of color filters. Each of the plurality of nano-optical micro-lenses includes a plurality of nanostructures to condense the incident light onto a corresponding pixel, and when viewed in a cross-section of the nano-optical micro-lens array, a fill factor denotes a ratio of an area of the nanostructures arranged within a reference circle among the plurality of nanostructures included in one of the plurality of nano-optical micro-lenses, and the reference has a pixel size corresponding to the one nano-optical micro-lens as a diameter, the fill factor is greater than or equal to 95%.

19 Claims, 25 Drawing Sheets

(51) Int. Cl.
*G02B 5/20* (2006.01)
*H04N 25/13* (2023.01)

(58) Field of Classification Search
CPC ............. G02B 2207/101; H10F 39/182; H10F 39/8023; H10F 39/8053; H10F 39/8063; B82Y 40/00
See application file for complete search history.

(56) References Cited

U.S. PATENT DOCUMENTS

| | | | | |
|---|---|---|---|---|
| 2021/0048342 | A1 | 2/2021 | Kim et al. | |
| 2022/0326415 | A1* | 10/2022 | Yun | G02B 3/0043 |
| 2023/0020980 | A1 | 1/2023 | Mun et al. | |
| 2023/0139533 | A1* | 5/2023 | Mun | G02B 3/0056 257/432 |
| 2024/0113142 | A1* | 4/2024 | Fu | G02B 1/002 |
| 2024/0145509 | A1* | 5/2024 | Mun | H10F 39/182 |
| 2024/0230960 | A1 | 7/2024 | Mun et al. | |
| 2025/0176291 | A1 | 5/2025 | Mun et al. | |
| 2025/0185396 | A1 | 6/2025 | Mun et al. | |

FOREIGN PATENT DOCUMENTS

| | | | |
|---|---|---|---|
| EP | 4 163 978 | A1 | 4/2023 |
| JP | 4531843 | B2 | 8/2010 |
| JP | 4957564 | B2 | 6/2012 |
| KR | 10-2017-0073910 | A | 6/2017 |
| KR | 10-2022-0096967 | A | 7/2022 |

* cited by examiner

| 121 | 122 | 121 | 122 |
| --- | --- | --- | --- |
| 123 | 124 | 123 | 124 |
| 121 | 122 | 121 | 122 |
| 123 | 124 | 123 | 124 |

120

Y

X

Z

IMAGE SENSOR AND ELECTRONIC APPARATUS INCLUDING THE IMAGE SENSOR

CROSS-REFERENCE TO RELATED APPLICATION

This application is based on and claims priority under 35 U.S.C. § 119 to Korean Patent Application No. 10-2023-0168239, filed on Nov. 28, 2023, in the Korean Intellectual Property Office, the disclosure of which is incorporated by reference herein in its entirety.

BACKGROUND

1. Field

Apparatuses and methods according to embodiments of the present disclosure relate to an image sensor and an electronic apparatus including the image sensor.

2. Description of the Related Art

As the resolution of image sensors increases, the size of unit pixels in image sensors is decreasing. To improve low-light sensitivity and resolution, pixel arrays with multiple channels of a single color may be used.

According to this trend, there has been research on micro-lens configurations which improve an autofocus (AF) function of image sensors and reduce the performance degradation of image sensors according to a chief ray angle variations.

SUMMARY

One or more embodiments provide an image sensor having a nano-optical micro-lens array capable of improving an autofocus (AF) function and crosstalk reduction performance.

According to an aspect of the disclosure, an image sensor may include: a sensor substrate including a plurality of pixels configured to sense incident light; a nano-optical micro-lens array including a plurality of nano-optical micro-lenses respectively corresponding to the plurality of pixels; and a color filter array disposed between the sensor substrate and the nano-optical micro-lens array and including a plurality of color filters, wherein each of the plurality of nano-optical micro-lenses may include a plurality of nanostructures to condense the incident light onto a corresponding pixel, and when viewed in a cross-section of the nano-optical micro-lens array, a fill factor denotes a ratio of an area of the nanostructures arranged within a reference circle among the plurality of nanostructures included in one of the plurality of nano-optical micro-lenses, and the reference circle has a pixel size corresponding to the one nano-optical micro-lens as a diameter, the fill factor is greater than or equal to 95%.

Among the plurality of nano-optical micro-lenses, the fill factor of the nano-optical micro-lens located at a centralmost point of the nano-optical micro-lens array may be 100%.

Each of the plurality of pixels may include four light photosensitive cells in a 2×2 arrangement.

The plurality of nanostructures may be arranged on a two-dimensional plane that is perpendicular to a direction in which the sensor substrate, the color filter, and the nano-optical micro-lens array are arranged. When positions at which the plurality of nanostructures are arranged in a form of an N×N matrix on the two-dimensional plane, the nanostructures are absent from one or more positions among four positions of (1, 1), (1, N), (N, 1), and (N, N). N is an integer that is greater than or equal to 3.

Among the plurality of nano-optical micro-lenses, the plurality of nanostructures included in the nano-optical micro-lens located at a center of the nano-optical micro-lens array may be absent from the four positions of (1, 1), (1, N), (N, 1), and (N, N) of the N×N matrix and may occupy remaining $N^2-4$ positions.

When the plurality of nano-optical micro-lenses are divided into a center and a periphery according to relative positions within the nano-optical micro-lens array, the plurality of nanostructures included in one nano-optical micro-lens located at the periphery are arranged in an order of increasing size toward the center in one row or one column.

When the plurality of nano-optical micro-lenses are divided into a center and a periphery according to relative positions within the nano-optical micro-lens array, among the plurality of nano-optical micro-lenses belonging to the periphery, in two nano-optical micro-lenses having different azimuth angles defined in the two-dimensional plane, positions at which the nanostructures are absent differ among the four positions of (1, 1), (1, N), (N, 1), and (N, N).

When the plurality of nano-optical micro-lenses are divided into a center and a periphery according to relative positions within the nano-optical micro-lens array, among the plurality of nano-optical micro-lenses belonging to the periphery, in the nano-optical micro-lens having an azimuth angle of 0 degree defined in the two-dimensional plane, the nanostructures are absent from the positions (1, N) and (N, N).

When the plurality of nano-optical micro-lenses are divided into a center and a periphery according to relative positions within the nano-optical micro-lens array, among the plurality of nano-optical micro-lenses belonging to the periphery, in the nano-optical micro-lens having an azimuth angle of 90 degrees defined in the two-dimensional plane, the nanostructures are absent from the positions of (1, 1) and (1, N).

When the plurality of nano-optical micro-lenses are divided into a center and a periphery according to relative positions within the nano-optical micro-lens array, among the plurality of nano-optical micro-lenses belonging to the periphery, in the nano-optical micro-lens having an azimuth angle of 180 degrees defined in the two-dimensional plane, the nanostructures are absent from the positions of (1, 1) and (N, 1).

When the plurality of nano-optical micro-lenses are divided into a center and a periphery according to relative positions within the nano-optical micro-lens array, among the plurality of nano-optical micro-lenses belonging to the periphery, in the nano-optical micro-lens having an azimuth angle of 270 degrees defined in the two-dimensional plane, the nanostructures are absent from the positions of (N, 1) and (N, N).

When the plurality of nano-optical micro-lenses are divided into a center and a periphery according to relative positions within the nano-optical micro-lens array, the fill factor of the nano-optical micro-lens at the center is greater than the fill factor of the nano-optical micro-lens at the periphery.

The plurality of nano-optical micro lenses may include: a first nano-optical micro-lens facing a green filter; a second nano-optical micro-lens facing a blue filter; and a third nano-optical micro-lens facing a red filter.

A fill factor of the second nano-optical micro-lens is less than a fill factor of the first nano-optical micro-lens or the third nano-optical micro-lens.

A number of nanostructures included in the second nano-optical micro-lens is greater than a number of nanostructures included in the first nano-optical micro-lens or the third nano-optical micro-lens.

The plurality of pixels may include first to fourth pixel groups adjacent in a 2×2 arrangement, each of the first to fourth pixel groups may include four first to fourth pixels adjacent in the 2×2 arrangement, the plurality of nano-optical micro-lenses may include four first to fourth nano-optical micro-lenses respectively corresponding to the four first to fourth pixels adjacent in the 2×2 arrangement, the color filter array may include a first green filter, a blue filter, a red filter, and a second green filter, and the first green filter, the blue filter, the red filter, and the second green filter respectively face the first to fourth pixel groups one-to-one.

The plurality of pixels may include first to fourth pixels adjacent in a 2×2 arrangement, each of the first to fourth pixels may include four photosensitive cells in the 2×2 arrangement, the plurality of nano-optical micro-lenses may include first to fourth nano-optical micro-lenses facing the first to fourth pixels, respectively, the color filter array may include a first green filter, a blue filter, a red filter, and a second green filter, and the first green filter, the blue filter, the red filter, and the second green filter may respectively face the first to fourth pixels one-to-one.

According to an another aspect of the disclosure, an electronic apparatus may include: a lens assembly including one or more lenses to form an optical image of a subject; the image sensor configured to convert the optical image into an electrical signal; and a processor configured to process the electrical signal generated by the image sensor.

According to an another aspect of the disclosure, an image sensor may include: a sensor substrate including a plurality of pixels configured to sense incident light; a nano-optical micro-lens array including a plurality of nano-optical micro-lenses respectively corresponding to the plurality of pixels; and a color filter array disposed between the sensor substrate and the nano-optical micro-lens array and including a plurality of color filters, wherein each of the plurality of nano-optical micro-lenses may include a plurality of nanostructures to condense the incident light onto a corresponding pixel, when the plurality of nanostructures are arranged in a form of an N×N matrix on a two-dimensional plane, in the nano-optical micro-lens disposed at a center of the nano-optical micro-lens array, the plurality of nanostructures are absent from four positions of (1, 1), (1, N), (N, 1), and (N, N) and are disposed at remaining $N^2-4$ positions, and wherein N is an integer that is greater than or equal to 3.

According to an another aspect of the disclosure, an image sensor, ay include: a sensor substrate including pixels configured to convert light into electrical signals; a nano-optical micro-lens lens array including nano-optical micro-lenses to focus light into the pixels; and a color filter array positioned between the sensor substrate and the nano-optical micro-lens lens array, wherein each of the nano-optical micro-lenses may include nanostructures that are arranged along perimeters of two concentric circles having different diameters, and are positioned away from pixel boundary lines and a center of the concentric circles.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2A is a plan view showing a color arrangement of a pixel array in an image sensor; FIGS. 2B, 2C, and 2D are schematic plan views respectively showing a sensor substrate, a color filter array, and a nano-optical micro-lens array included in the pixel array;

DETAILED DESCRIPTION

Figure 1:
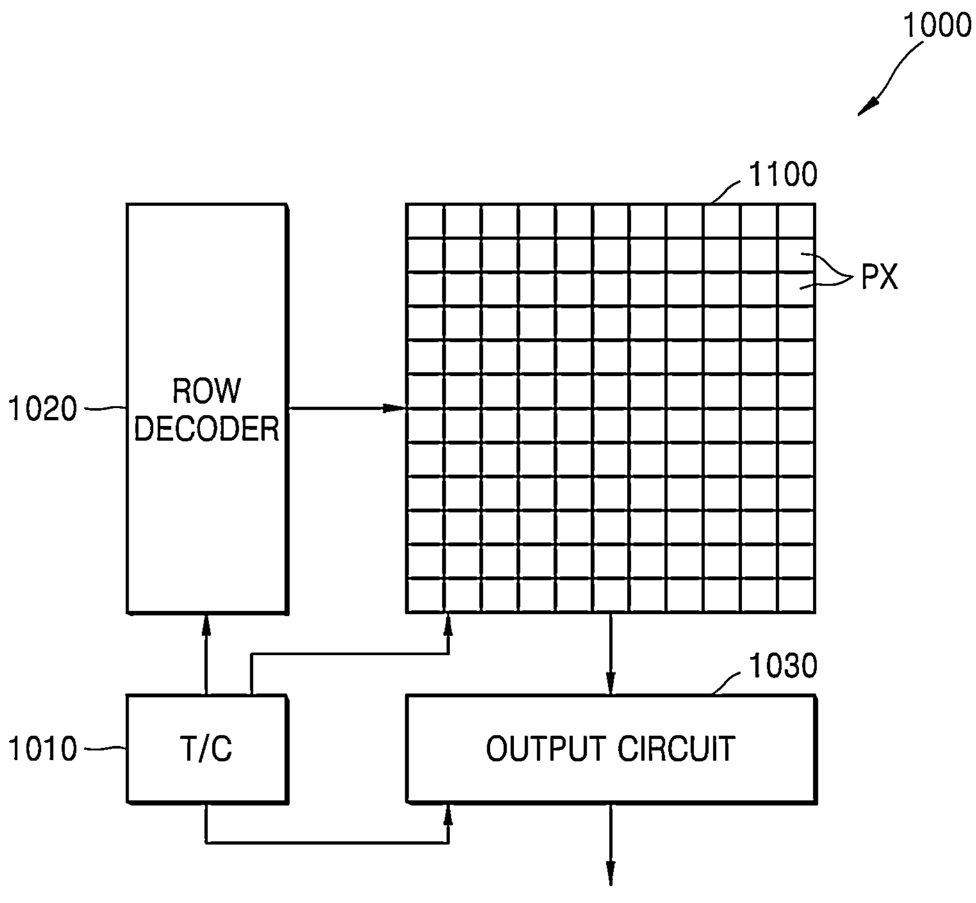
FIG. 1 is a block diagram of an image sensor according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, it will be understood that when a component is referred to as being "above" or "on" another component, the component may be directly on the other component or over the other component in a non-contact manner.

It will be understood that although the terms "first," "second," etc. may be used herein to describe various components, these components are only used to distinguish one component from another. These terms do not limit that materials or structures of components are different from one another.

An expression used in the singular encompasses the expression of the plural, unless it has a clearly different meaning in the context. It will be further understood that when a portion is referred to as "comprises" another component, the portion may not exclude another component but may further comprise another component unless the context states otherwise.

Also, the terms " . . . unit" and " . . . module" used herein specify a unit for processing at least one function or operation, and this may be implemented with hardware or software or a combination of hardware and software.

The use of the terms "a", "an", and "the" and similar referents are to be construed to cover both the singular and the plural.

Also, the steps of all methods described herein may be performed in any suitable order unless otherwise indicated herein or otherwise clearly contradicted by context. Also, the use of all exemplary terms (for example, etc.) provided herein, are intended merely to better illuminate the technical ideas and does not pose a limitation on the scope of rights unless otherwise claimed.

FIG. 1 is a block diagram of an image sensor 1000 according to an embodiment. Referring to FIG. 1, the image sensor 1000 may include a pixel array 1100, a timing controller 1010, a row decoder 1020, and an output circuit 1030. The image sensor 1000 may include a charge-coupled device (CCD) image sensor or a complementary metal oxide semiconductor (CMOS) image sensor.

The pixel array 1100 includes pixels that are two-dimensionally arranged in a plurality of rows and columns. The row decoder 1020 selects one of the rows in the pixel array 1100 in response to a row address signal output from the timing controller 1010. The output circuit 1030 outputs a photosensitive signal, in a column unit, from a plurality of pixels arranged in the selected row. To this end, the output circuit 1030 may include a column decoder and an analog-to-digital converter (ADC). For example, the output circuit 1030 may include a plurality of ADCs that are arranged respectively to columns between the column decoder and the pixel array 1100, or one ADC arranged at an output end of the column decoder. The timing controller 1010, the row decoder 1020, and the output circuit 1030 may be implemented as one chip or separate chips. A processor may process an image signal output from the output circuit 1030 in a digital form. The processor may be implemented as a single chip along with the timing controller 1010, the row decoder 1020, and the output circuit 1030.

The pixel array 1100 may include a plurality of pixels PX that sense light of different wavelengths. A pixel color arrangement may be implemented in various ways.

Figure 2A:
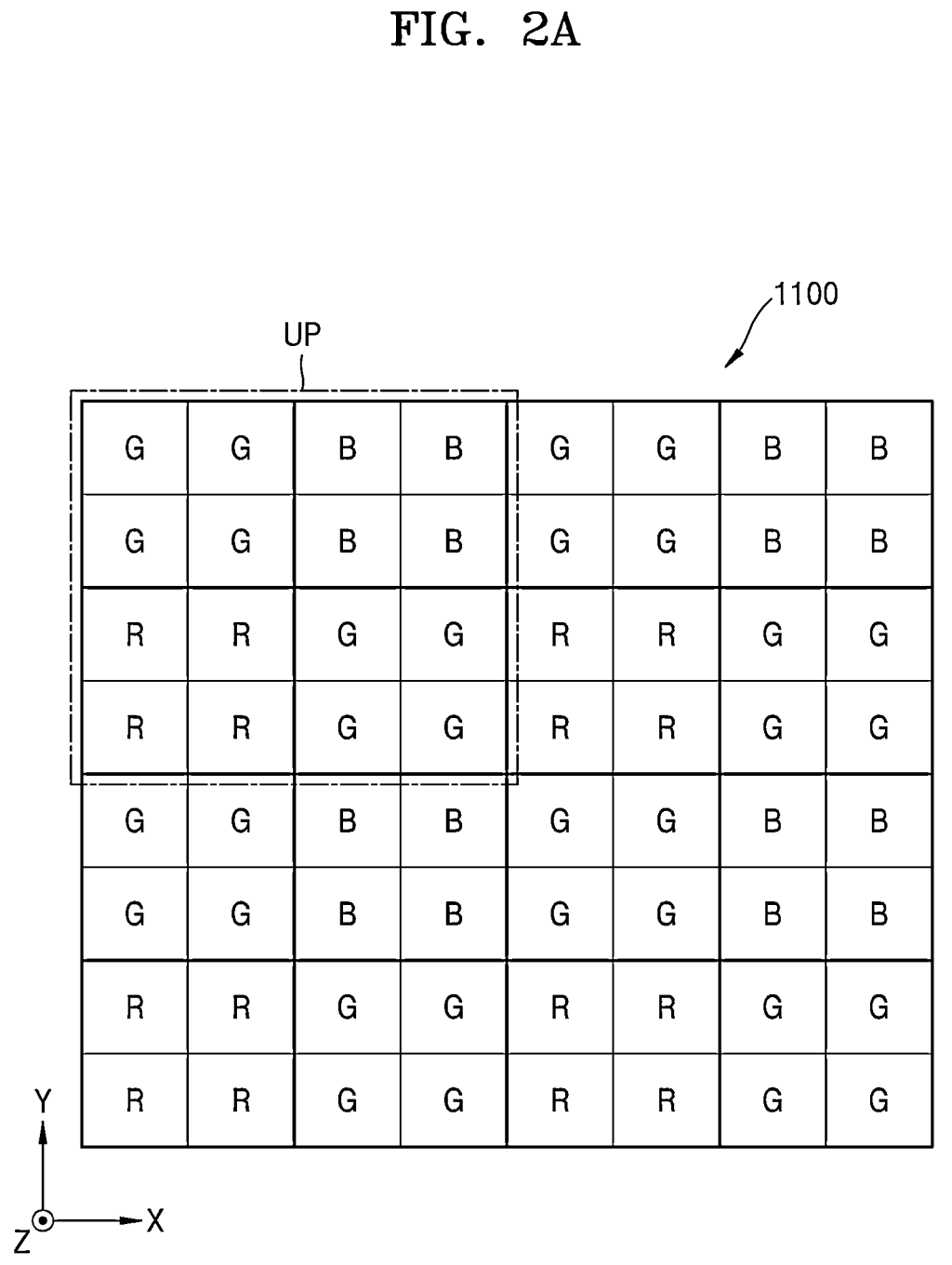
Figure 2B:
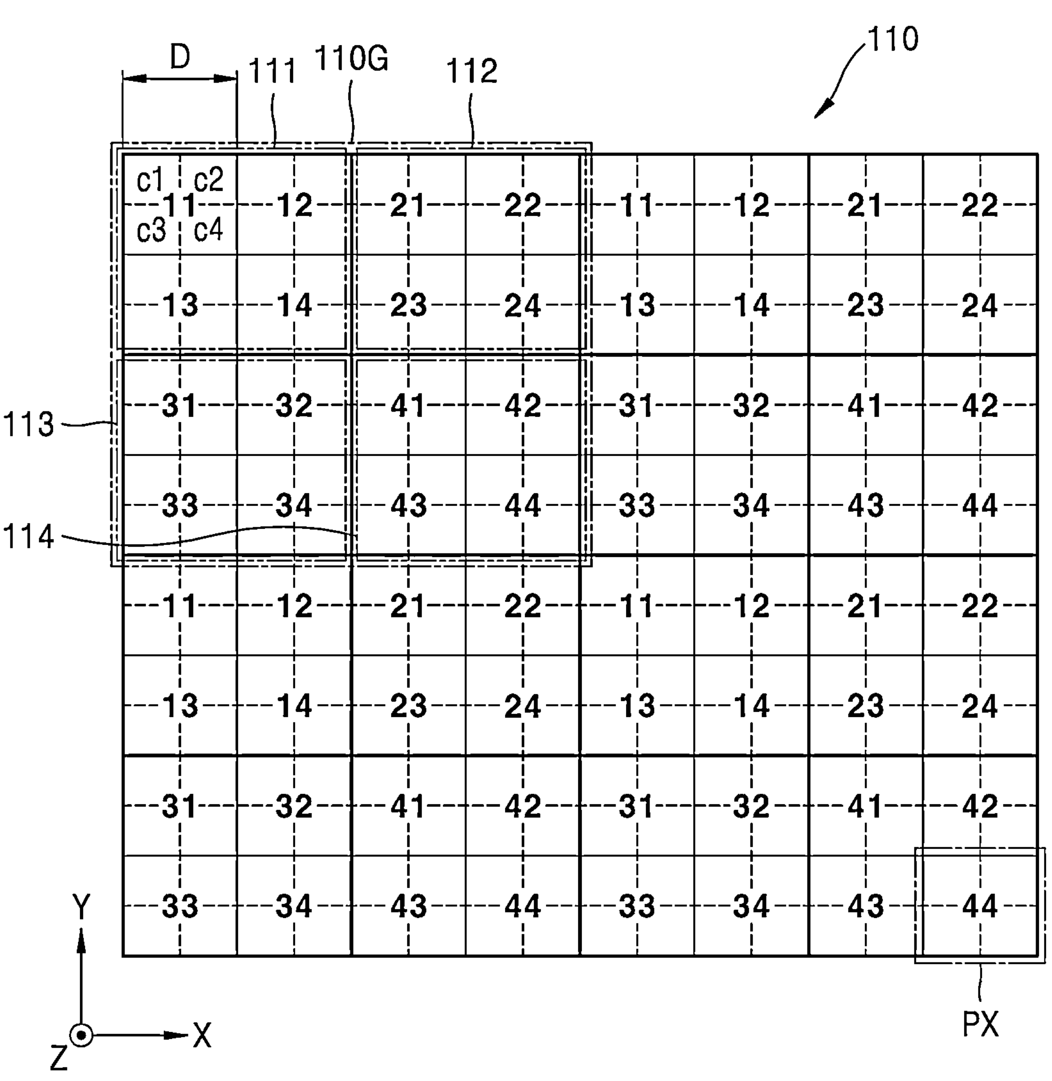
Figure 2D:
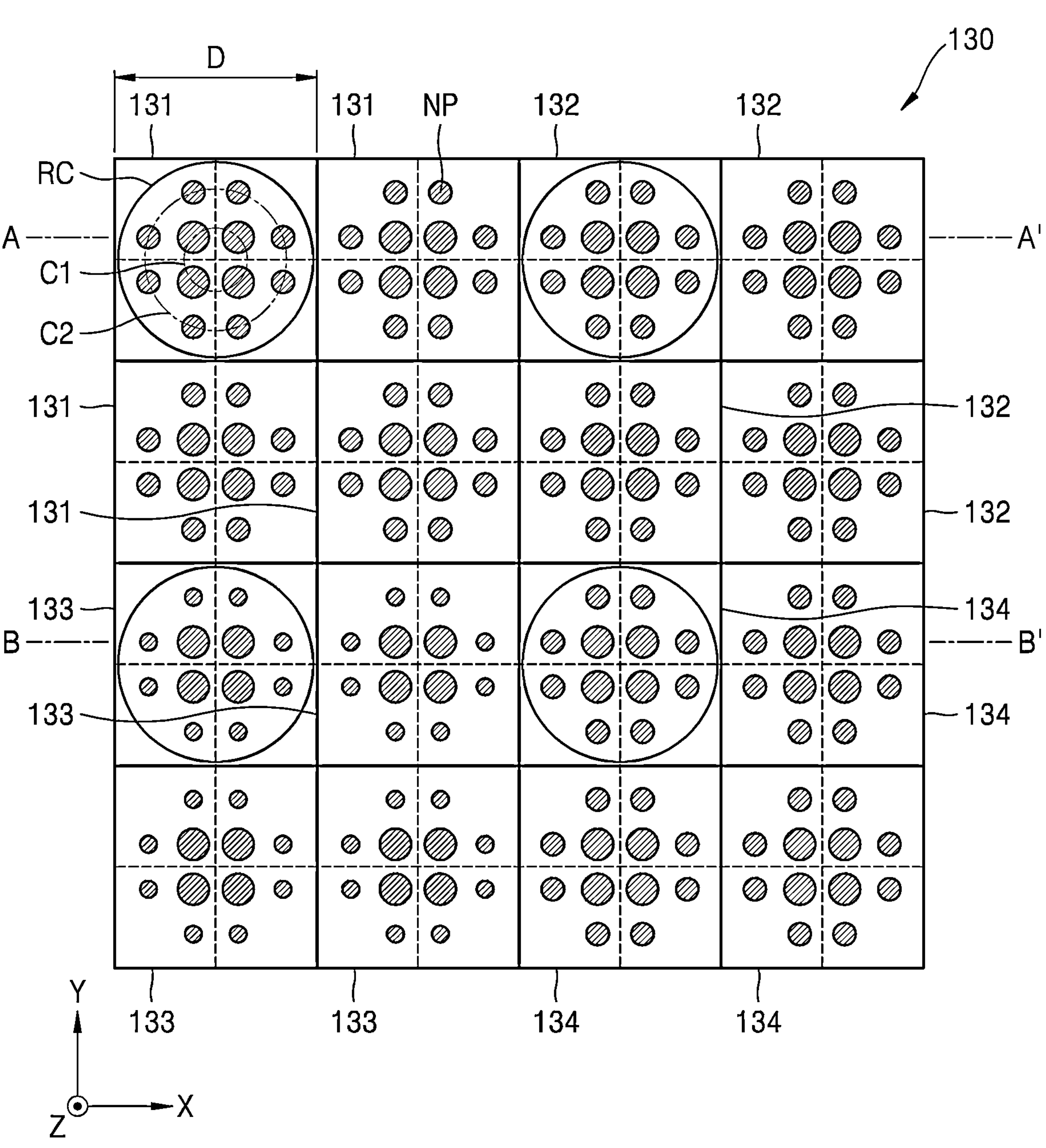
Figure 3A:
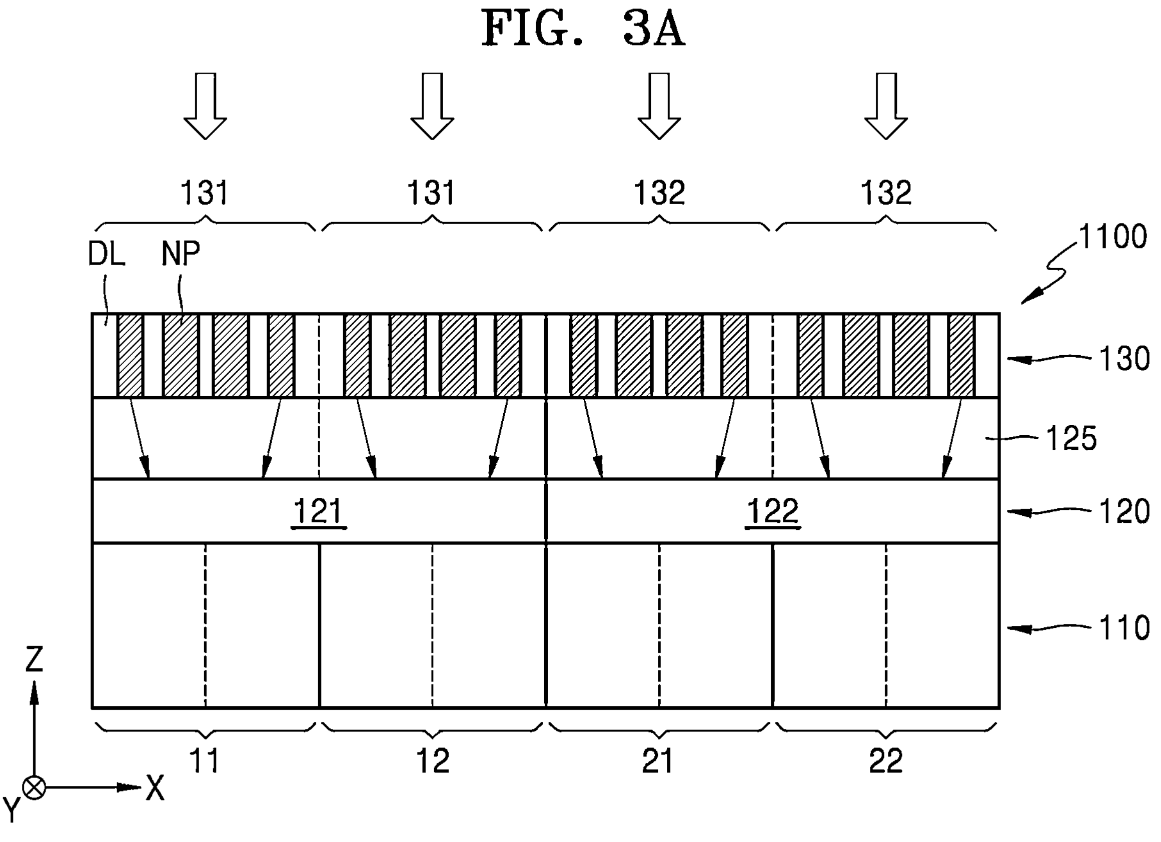
FIGS. 3A and 3B are cross-sectional views of the pixel array of the image sensor taken along lines AA' and BB' of FIG. 2D.
Figure 3B:
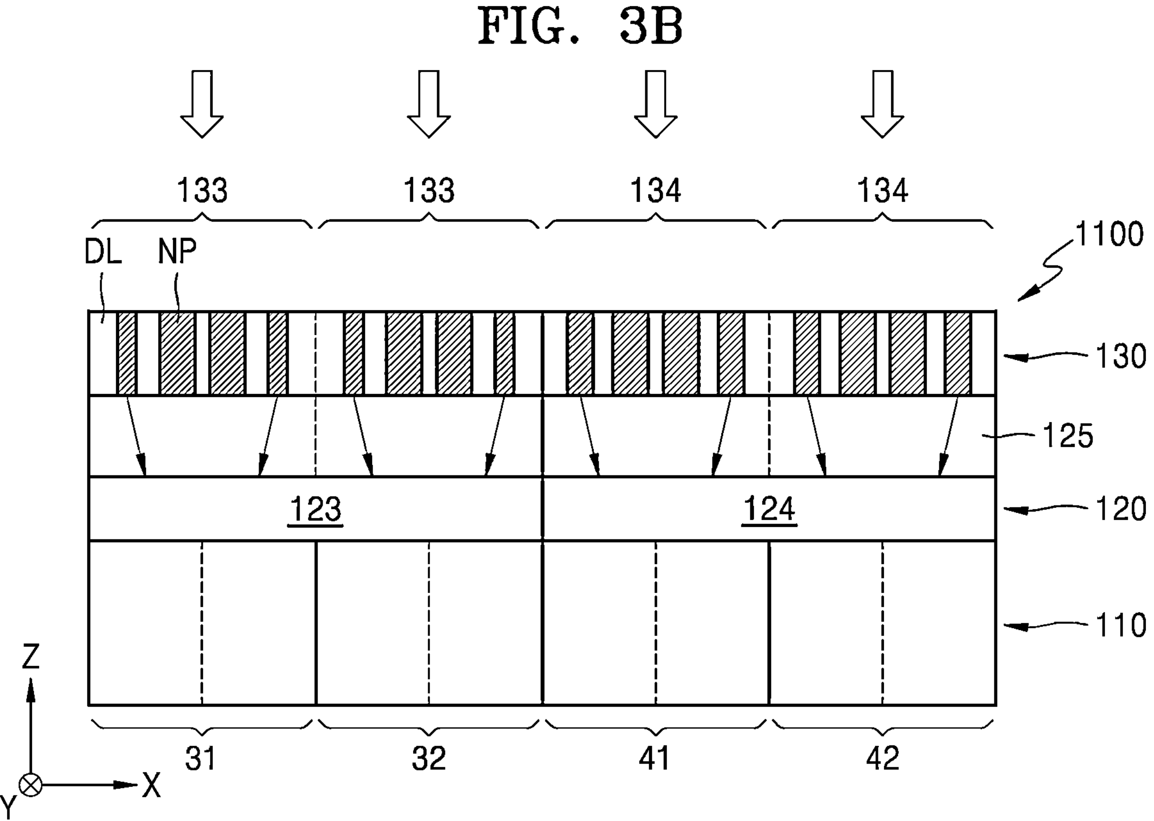

FIG. 2A is a plan view showing a color arrangement of the pixel array 1100 in the image sensor 1000. FIGS. 2B to 2D are schematic plan views respectively showing a sensor substrate 110, a color filter array 120, and a nano-optical micro-lens array 130 included in the pixel array 1100. FIGS. 3A and 3B are cross-sectional views of the pixel array 1100 of the image sensor 1000 taken along lines AA' and BB' of FIG. 2D.

The color arrangement shown in FIG. 2A is similar to a Bayer pattern, but is different from the Bayer pattern in that the same colors are adjacent to each other in a 2×2 arrangement. A 2×2 arrangement of green (G) color, a 2×2 arrangement of blue (B) color, a 2×2 arrangement of red (R) color, and a 2×2 arrangement of green (G) color form a unit pattern UP, and the unit patterns UP are repeatedly and two-dimensionally arranged. Such a color arrangement may be used to improve sensitivity of an ultra-small image sensor.

The color arrangement of FIG. 2A is an example, and the disclosure is not limited thereto. For example, a CYGM method, in which magenta (M), cyan (C), yellow (Y), and green (G) are represented in one unit pattern, or an RGBW method in which green, red, blue, and white are represented in one unit pattern may be used. In addition, the unit patterns may be implemented in a 3×2 array, and the pixels in the pixel array 1100 may be arranged in various ways according to color characteristics of the image sensor 1000. Hereinafter, an example in which the pixel array 1100 of the image sensor 1000 has the Bayer pattern is described, but an operation principle may be applied to types of pixel arrangements other than the Bayer pattern.

The pixel array 1100 of the image sensor 1000 may include the sensor substrate 110 having a plurality of pixels for sensing light, the color filter array 120 in which a plurality of color filters are arranged, and the nano-optical micro-lens array 130 including a plurality of nano-optical micro-lenses that focus light onto each pixel of the sensor substrate 110. FIGS. 2B to 2D are plan views showing the sensor substrate 110, the color filter array 120, and the nano-optical micro-lens array 130. The sensor substrate 110, the color filter array 120, and the nano-optical micro-lens array 130 may be arranged in a first direction (Z direction).

Referring to FIG. 2B, the sensor substrate 110 may include the plurality of pixels PX sensing incident light, i.e., generating an image signal by converting the incident light into an electrical signal. The plurality of pixels PX may be two-dimensionally arranged in a second direction (X direction) and a third direction (Y direction) perpendicular to the first direction (Z direction). The sensor substrate 110 may include a plurality of unit pixel groups 110G. The unit pixel groups 110G correspond to the unit patterns UP on a one-to-one basis shown in FIG. 2A. The unit pixel group 110G includes a first pixel group 111, a second pixel group 112, a third pixel group 113, and a fourth pixel group 114. The first pixel group 111 includes four first pixels 11, 12, 13, and 14 in a 2×2 arrangement, the second pixel group 112 includes four second pixels 21, 22, 23, and 24 in a 2×2 arrangement, the third pixel group 113 includes four third pixels 31, 32, 33, and 34 in a 2×2 arrangement, and the fourth pixel group 114 includes four fourth pixels 41, 42, 43, and 44 in a 2×2 arrangement. When common matters between the first to fourth pixels 11 to 14, 21 to 24, 31 to 34, and 41 to 44 are explained, the first to fourth pixels 11 to 14, 21 to 24, 31 to 34, and 41 to 44 may simply be collectively referred to as the pixels PX.

The pixel arrangement of the sensor substrate 110 is provided for sensing the incident light by classifying the incident light into colors of the arrangement as shown in FIG. 2A. The first pixel group 111 and the fourth pixel group 114 may be sensitive to and capture green light, and thus may correspond to green light. The second pixel group 112 may be sensitive to and capture blue light, and thus may correspond to blue light. The third pixel group 113 may be sensitive to and capture red light, and thus may correspond to red light. Hereinafter, the first pixel group 111 may be interchangeably referred to as a first green pixel group, the second pixel group 112 as a blue pixel group, the third pixel group 113 as a red pixel group, and the fourth pixel group 114 as a second green pixel group. In addition, the first pixels 11 to 14 may be interchangeably used as first green pixels, the second pixels 21 to 24 as blue pixels, the third pixels 31 to 34 as red pixels, and the fourth pixels 41 to 44 as second green pixels.

Each of the pixels PX may include a plurality of photosensitive cells that independently sense incident light. For example, as shown, one pixel PX may include four photosensitive cells c1, c2, c3, and c4. However, this is an example, and one pixel PX may be partitioned into two or more various numbers of photosensitive cells. For example, one pixel PX may include two photosensitive cells, or a plurality of independent photosensitive cells clustered and arranged in a 3×3 array or 4×4 array.

The adjacent pixels PX and the plurality of photosensitive cells within the pixel PX may be electrically separated from each other by an isolation structure. Although simply shown as a line in the drawing, the isolation structure may have a physical thickness. The isolation structure may be formed as, for example, a deep trench isolation (DTI) structure. A deep trench may be filled with air or an electrically insulating material. A plurality of electrically separated cells may be formed by forming an optical sensing layer, and then forming the DTI structure on the optical sensing layer.

A width of the pixel PX may be referred to as D. At this time, D denotes an actual width of the optical sensing region excluding a thickness of the DTI structure. D may therefore be less than a period in which the pixel PX is repeated.

When one pixel PX includes the plurality of photosensitive cells, some of the plurality of pixels PX may be used as autofocus (AF) pixels. In an AF pixel, an AF signal may be obtained from a difference between output signals of adjacent photosensitive cells.

For example, the AF signal in the second direction (X direction) may be generated from a difference between an output signal of the first photosensitive cell c1 and an output signal of the second photosensitive cell c2, a difference between an output signal of the third photosensitive cell c3 and an output signal of the fourth photosensitive cell c4, or a difference between the sum of the output signals of the first photosensitive cell c1 and the third photosensitive cell c3 and the sum of the output signals between the second photosensitive cell c2 and the fourth photosensitive cell c4. In addition, the AF signal in the third direction (Y direction) may be generated from a difference between the output signal of the first photosensitive cell c1 and from the output signal of the third photosensitive cell c3, a difference between the output signal of the second photosensitive cell c2 and the output signal of the fourth photosensitive cell c4, or a difference between the sum of the output signals of the first photosensitive cell c1 and the second photosensitive cell c2 and the sum of the output signals of the third photosensitive cell c3 and the fourth photosensitive cell c4.

Meanwhile, methods of obtaining a general image signal include a sum mode and a full mode. In the sum mode, an image signal may be obtained by summing the output signals of the first to fourth photosensitive cells c1, c2, c3, and c4. For example, a first green image signal may be generated by summing the output signals of the first to fourth photosensitive cells c1, c2, c3, and c4 of the first pixel 111, a blue image signal may be generated by summing the output signals of the first to fourth photosensitive cells c1, c2, c3, and c4 of the second pixel 112, a red image signal may be generated by summing the output signals of the first to fourth photosensitive cells c1, c2, c3, and c4 of the third pixel 113, and a second green image signal may be generated by summing the output signals of the first to fourth photosensitive cells c1, c2, c3, and c4 of the fourth pixel 114. In the full mode, each output signal is obtained by using each of the first to fourth photosensitive cells c1, c2, c3, and c4 as an individual pixel. In this case, an image of high resolution may be obtained.

Referring to FIG. 2C, the color filter array 120 may include a plurality of color filters that selectively transmit light of different wavelength bands among incident light. The plurality of color filters may correspond one-to-one to a plurality of pixel groups of the sensor substrate 110 shown in FIG. 2B. For example, the color filter array 120 may include a first color filter 121 disposed facing the first pixel group 111, a second color filter 122 disposed facing the second pixel group 112, a third color filter 123 disposed facing the third pixel group 113, and a fourth color filter 124 disposed facing the fourth pixel group 114. Like the first to fourth pixel groups 111, 112, 113, and 114, unit groups including the plurality of first to fourth color filters 121, 122, 123, and 124 may be arranged two-dimensionally in the second direction (X direction) and the third direction (Y direction).

The first and fourth color filters 121 and 124 may be green filters that transmit light in a green wavelength band among the incident light and block, for example, absorb, light in other wavelength bands, the second color filter 122 may be a blue filter that transmits light in a blue wavelength band and blocks light in other wavelength bands, and the third color filter 123 may be a red filter that transmits light in a red wavelength band among incident light and blocks light in other wavelength bands. The first to fourth color filters 121, 122, 123, and 124 may be organic color filters each including an organic dye or an organic pigment.

Referring to FIG. 2D, the nano-optical micro-lens array 130 may include a plurality of first nano-optical micro-lenses 131, a plurality of second nano-optical micro-lenses 132, a plurality of third nano-optical micro-lenses 133, and a plurality of fourth nano-optical micro lenses 134. The nano-optical micro-lens array 130 may include four first nano-optical micro-lenses 131 that face the first pixels 11, 12, 13, and 14 one-to-one and respectively condense light onto the first pixels 11, 12, 13, and 14, four second nano-optical micro-lenses 132 that face the second pixels 21, 22, 23, and 24 one-to-one and respectively condense light onto the second pixels 21, 22, 23, and 24, four third nano-optical micro-lenses 133 that face the third pixels 31, 32, 33, and 34 one-to-one and respectively condense light onto the third pixels 31, 32, 33, and 34, and four fourth nano-optical micro-lenses 134 that face the fourth pixels 41, 42, 43, and 44 one-to-one and respectively condense light onto the fourth pixels 41, 42, 43, and 44. The 16 first to fourth nano-optical micro-lenses 131, 132, 133, and 134 may form one lens group facing one unit pixel group 110G, and a plurality of lens groups may be arranged two-dimensionally and repeatedly. FIG. 2D shows only one lens group.

As described with reference to FIGS. 2A to 2D, a structure in which pixels representing the same color form a group of four units in a 2×2 arrangement, each pixel PX includes four photosensitive cells, and the plurality of nano-optical micro-lenses face the plurality of pixels PX one-to-one may be referred to as a Tetra Square structure. As previously explained, the four photosensitive cells c1, c2, c3, and c4 included in each pixel PX may be used only for generating an AF signal and not as an independent image pixel, or may be used for generating an AF signal and an independent image pixel.

Each of the first nano-optical micro-lenses 131, the second nano-optical micro-lenses 132, the third nano-optical micro-lenses 133, and the fourth nano-optical micro-lenses 134 may have a nano-pattern structure capable of condensing light. The nano-pattern structure may include a plurality of nanostructures NP that change a phase of incident light differently according to an incident position. Shapes, sizes (widths and heights), distances, an arrangement form, etc. of the plurality of nanostructures NP may be determined such that light immediately after passing through each of the first nano-optical micro-lenses 131, the second nano-optical micro-lenses 132, the third nano-optical micro-lenses 133, and the fourth nano-optical micro-lenses 134 has a certain phase profile. According to the phase profile, a travel direction and a focal distance of the light passing through each of the first nano-optical micro-lenses 131, the second nano-optical micro-lenses 132, the third nano-optical micro-lenses 133, and the fourth nano-optical micro-lenses 134 may be determined. In other words, in accordance with the phase profile, detailed shapes and arrangement of the nanostructures NP included in each of the first nano-optical micro-lenses 131, the second nano-optical micro-lenses 132, the third nano-optical micro-lenses 133, and the fourth nano-optical micro-lenses 134 may be determined. In addition, the detailed shapes and arrangement of the nanostructures NP may be determined according to a relative position of a lens group to which the nanostructures NP belong within the nano-optical micro-lens array 130. For example, nanostructures NP may be arranged along the perimeters of two concentric circles—a first circle C1 having a first diameter d and a second circle C2 having a second diameter $d_2$greater than the first diameter d. The nanostructures NP may be positioned away from pixel boundaries and the center of the concentric circles to mitigate crosstalk between adjacent pixels, and to allow a sharper focus on the pixel center and thereby enhancing autofocus capabilities.

Referring to FIGS. 3A and 3B, the pixel array 1100 includes the sensor substrate 110 and the nano-optical micro lens array 130 disposed on the sensor substrate 110. The color filter array 120 may be further disposed between the sensor substrate 110 and the nano-optical micro-lens array 130. The first pixels 11, 12, 13, and 14, the second pixels 21, 22, 23, and 24, the third pixels 31, 32, 33, and 34, and the fourth pixels 41, 42, 43, and 44 of the sensor substrate 110, the first to fourth color filters 121, 122, 123, 124 of the color filter array 120, and the first to fourth nano-optical micro-lenses 131, 132, 133, and 134 of the nano-optical color separation lens array 130 may have a corresponding relationship as described with reference to FIGS. 2A to 2D.

A planarization layer 125 may be further disposed between the color filter array 120 and the nano-optical micro-lens array 130. Upper surfaces of the first to fourth color filters 121, 122, 123, and 124 are shown to be flat, but this is an example and the upper surfaces may not be flat. In addition, thicknesses of the first to fourth color filters 121, 122, 123, and 124 and black matrixes therebetween may not be the same. The planarization layer 125 may serve to provide a flat surface for forming the nano-optical micro-lens array 130 on the filter layer 120. The planarization layer 125 may include an organic polymer material that is suitable for stacking and is easy to form the flat surface on the first to fourth color filters 121, 122, 123, and 124 including an organic material. The organic polymer material forming the planarization layer 125 may have transparent properties with respect to visible light. For example, the planarization layer 125 may include at least one organic polymer material among epoxy resin, polyimide, polycarbonate, polyacrylate, and polymethyl methacrylate (PMMA). An encapsulation layer may be further disposed on the planarization layer 125. The encapsulation layer may serve as a protective layer preventing the planarization layer 125 including the organic polymer material from being damaged during a process of forming the nano-optical micro lens array 130 on the planarization layer 125. In addition, the encapsulation layer may serve as an anti-diffusion layer preventing a metal component of the color filter array 120 from passing through the planarization layer 125 and being exposed to the outside due to a high temperature in the process of forming the nano-optical micro-lens array 130. To this end, the encapsulation layer may include an inorganic material. The inorganic material of the encapsulation layer may be formed at a temperature lower than a process temperature for forming the nano-optical micro-lens array 130 and may include a transparent material with respect to the visible light. In addition, in order to reduce a reflection loss at an interface between the planarization layer 125 and the encapsulation layer, it is advantageous that a refractive index of the encapsulation layer is similar to a refractive index of the planarization layer 125. For example, a difference between the refractive index of the planarization layer 125 and the refractive index of the encapsulation layer may be within ±20% of the refractive index of the planarization layer 125. For example, the encapsulation layer may include at least one inorganic material among $SiO_2$, SiN, and SiON.

The planarization layer 125 may be formed to a thickness that satisfies appropriate distance requirements in relation to the focal lengths of the first to fourth nano-optical micro-lenses 131, 132, 133, and 134. The planarization layer 125 is an example and may be omitted in some cases.

Each of the first to fourth nano-optical micro-lenses 131, 132, 133, and 134 may include the plurality of nanostructures NP. The nanostructure NP may be a nano-pillar in which a cross-sectional diameter has a dimension of a sub wavelength. Here, the sub wavelength refers to a wavelength less than a wavelength band of light to be condensed. When the incident light is visible light, the cross-sectional diameter of the nanostructure NP may have the dimension less than, for example, 400 nm, 300 nm, 200 nm, or 100 nm. Meanwhile, a height of the nanostructure NP may be about 500 nm to about 1500 nm, and may be greater than the cross-sectional diameter. That is, an aspect ratio of the nanostructure NP may be greater than 1, for example, 2 or more, 3 or more, or 5 or more.

The nanostructure NP may include a material having a relatively high refractive index compared to a peripheral material and a relatively low absorption rate in a visible light band. For example, the nanostructure NP may include c-Si, p-Si, a-Si and a Group III-V compound semiconductor (GaP, GaN, GaAs, etc.), SiC, $TiO_2$, $SiN_3$, ZnS, ZnSe, $Si_3N_4$, and/or a combination thereof. The area around the nanostructure NP may be filled with a dielectric material DL having a relatively lower refractive index than the nanostructure NP and a relatively low absorption rate in the visible light band. For example, the area around the nanostructure NP may be filled with silanol-based glass (SOG), $SiO_2$, $Al_2O_3$, air, etc.

The refractive index of the nanostructure NP having a high refractive index may be about 2.0 or more with respect to light having a wavelength of about 630 nm, and a refractive index of the dielectric material DL having a low refractive index may be about 1.0 or more and less than 2.0 with respect to light having a wavelength of about 630 nm. In addition, a difference between the refractive index of the nanostructure NP and the refractive index of the dielectric material DL may be about 0.5 or more. The nanostructure NP having a different refractive index from the refractive index of the peripheral material may change the phase of light passing through the nanostructure NP. This is caused by phase delay that occurs due to a shape dimension of the sub wavelength of the nanostructure NP, and a degree at which the phase is delayed, may be determined by a detailed shape dimension and arrangement shape of the nanostructure NP.

FIGS. 3A and 3B show that the nano-optical micro-lens array 130 and the sensor substrate 110 have centers of corresponding lenses and pixels aligned. That is, the centers of the first pixel 11 and the first nano-optical micro-lens 131 facing the first pixel 11 are aligned, the centers of the first pixel 12 and the first nano-optical micro-lens 131 facing the first pixel 12 are aligned, the centers of the second pixel 21 and the second nano-optical micro-lens 132 facing the second pixel 21 are aligned, and the centers of the second pixel 22 and the second nano-optical micro-lens 132 facing the second pixel 22 are aligned. The centers of the third pixels 31 and 32 and the third nano-optical micro-lens 133 and the centers of the fourth pixels 41 and 42 and the fourth nano-optical micro-lens 134 are similarly arranged. This arrangement illustrates the center where a chief ray angle of the incident light is 0 degree, and at other positions, the centers of nano-optical micro-lenses and pixels facing the nano-optical micro-lenses may be misaligned. A degree of misalignment may increase farther away from the center of the nano-optical micro-lens array 130.

At the positions shown, the plurality of nanostructures NP included in each of the first to fourth nano-optical micro-lenses 131, 132, 133, and 134 may have shapes and arrangement forming a phase profile with a convex center. That is, the shapes and arrangement of the plurality of nanostructures NP included in each of the first to fourth nano-optical micro-lenses 131, 132, 133, and 134 may be determined such that the plurality of nanostructures NP serve as convex lenses respectively condensing the incident light having the chief ray angle of 0 degree onto the first to fourth pixels 11, 12, 21, 22, 31, 32, 33, and 34.

The first to fourth nano-optical micro-lenses 131, 132, 133, and 134 each have a flat light incident surface, and may be called flat nano-optical micro-lenses, compared to a general condensing lens having a curved light incident surface.

As described above, the light incident on the pixel array 1100 may pass through the nano-optical micro-lens array 130 and have a certain light condensing distribution, among the light passing through the nano-optical micro-lens array 130, green light may pass through the first and fourth color filters 121 and 124 and be condensed onto the four first pixels 11, 12, 13, and 14 and the four fourth pixels 41, 42, 43, and 44, blue light may pass through the second color filter 122 and be condensed onto the four second pixels 21, 22, 23, and 24, and red light may pass through the third color filter 123 and be condensed onto the four third pixels 31, 32, 33, and 34.

The nano-optical micro-lens array 130 provided in the pixel array 1100 according to an embodiment, in addition to the above-described light condensing performance, sets the arrangement of the nanostructures NP in consideration of improved AF performance and reduction of crosstalk between adjacent pixels.

Again, referring to FIG. 2D, the arrangement of the nanostructures NP is described in detail.

The nanostructures NP forming one first nano-optical micro-lens 131 may not be evenly distributed over the entire region within the first nano-optical micro-lens 131, but may be mostly arranged within a certain region. For example, the nanostructures NP may be mostly arranged within a reference circle RC having a width D of the first pixel 11 facing the reference circle RC as a diameter. In the drawing, all the nanostructures NP are arranged within the reference circle RC, but this is an example. In the illustrated plan view, when a ratio of the area of the nanostructures NP arranged within the reference circle RC to the entire area of the nanostructures NP included in the first nano-optical micro-lens 131 is referred to as a fill factor, the fill factor may be 90% or more or 95% or more Even within each of the second nano-optical micro-lenses 132, the third nano-optical micro-lenses 133, and the fourth nano-optical micro-lenses 134, the fill factor may be 90% or more or 95% or more.

The first nano-optical micro-lens 131, the second nano-optical micro-lens 132, and the third nano-optical micro-lens 133 may have different fill factors. In the drawing, the nanostructures NP included in the first to fourth nano-optical micro-lenses 131, 132, 133, and 134 have the same number and similar sizes, but this is an example. The nanostructures NP provided in the second nano-optical micro-lenses 132 corresponding to the blue pixel may have a larger cross-sectional area than the nanostructures NP provided in each of the first nano-optical micro-lens 131, the third nano-optical micro-lens 133, and the fourth nano-optical micro-lens 134, or may also be a greater number. Accordingly, the fill factor of the arrangement of the nanostructures NP of the second nano-optical micro-lens 132 may be less than the fill factor of the first nano-optical micro-lens 131 and the third nano-optical micro-lens 133.

The arrangement of the nanostructures NP may be described as an N×N matrix defined on an X-Y plane shown. Here, N may be an integer of 3 or more. The arrangement of the nanostructures NP may be determined so that the nanostructures NP are not disposed at one or more of four positions (1, 1), (1, N), (N, 1), and (N, N) on the N×N matrix. In other words, the nanostructures NP may be arranged in such a way that $N^2$ nanostructures NP are aligned in N rows and N columns, and then, one or more of the four nanostructures NP located at four corners are excluded or removed, so that nanostructures NP are positioned away from the four corners of each nano-optical micro lens 131-134. FIG. 2D shows that N is 4, the nanostructures NP are not located at all the four corner positions, but located only at remaining $N^2-4$ positions, that is, 12 positions.

Arranging the nanostructures NP as above is to correct a phase contour formed by nano-optical micro-lenses to be close to a circular shape and to reduce crosstalk with adjacent pixels. In addition, a focus formed by the nano-optical micro-lenses may be on the center of the corresponding pixel, thereby improving AF performance.

Figure 4A:
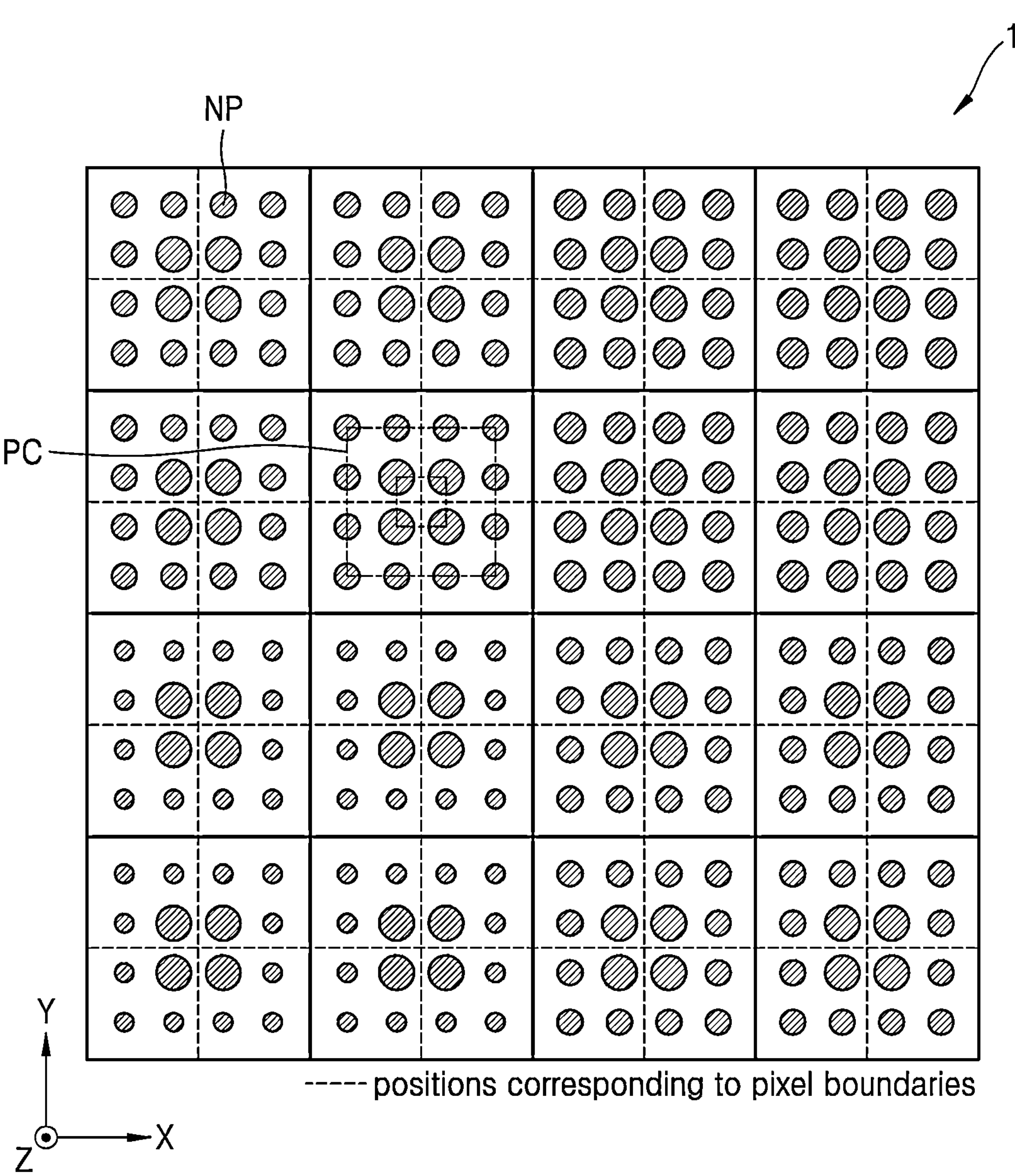
FIGS. 4A and 4B are plan views showing nano-optical micro-lens arrays according to comparative examples 1 and 2.
Figure 4B:
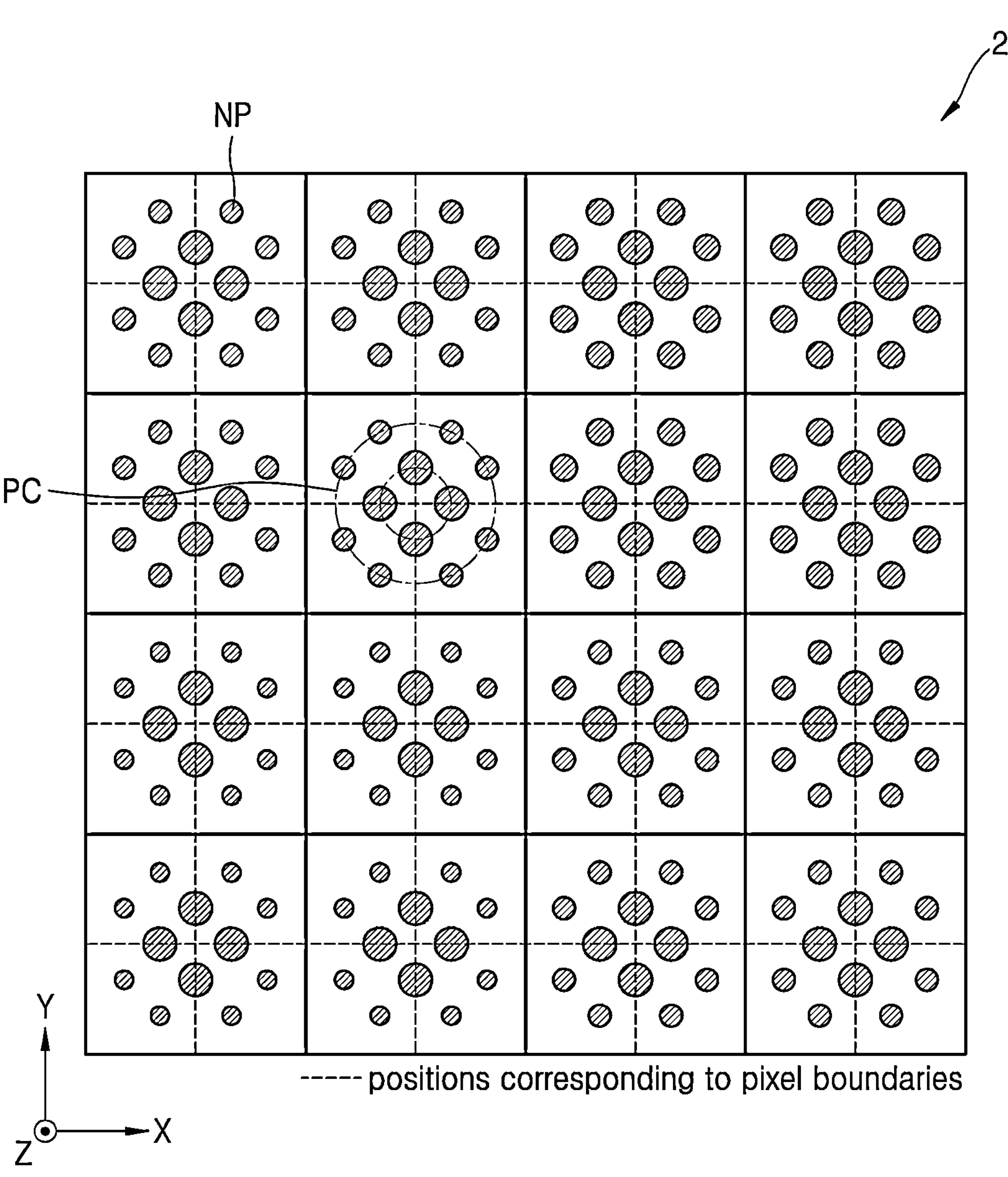

FIGS. 4A and 4B are plan views showing nano-optical micro-lens arrays 1 and 2 according to comparative examples 1 and 2.

The nano-optical micro-lens array 1 of comparative example 1 shown in FIG. 4A shows a lens group corresponding to FIG. 2D, and the nanostructures NP included in each nano-optical micro-lens are arranged in an N×N shape. The phase of incident light due to such an arrangement of the nanostructures NP may exhibit a phase contour PC that is close to a square.

The nano-optical micro-lens array 2 of comparative example 2 shown in FIG. 4B has an arrangement of the nanostructures NP corresponding to a form in which the arrangement of the nanostructures NP of FIG. 4A is rotated by 45 degrees. The phase of incident light due to such an arrangement of the nanostructures NP may have a phase contour PC that is close to a circular shape. In FIG. 4B, nanostructures NP may be located at positions corresponding to pixel boundaries.

Figure 5A:
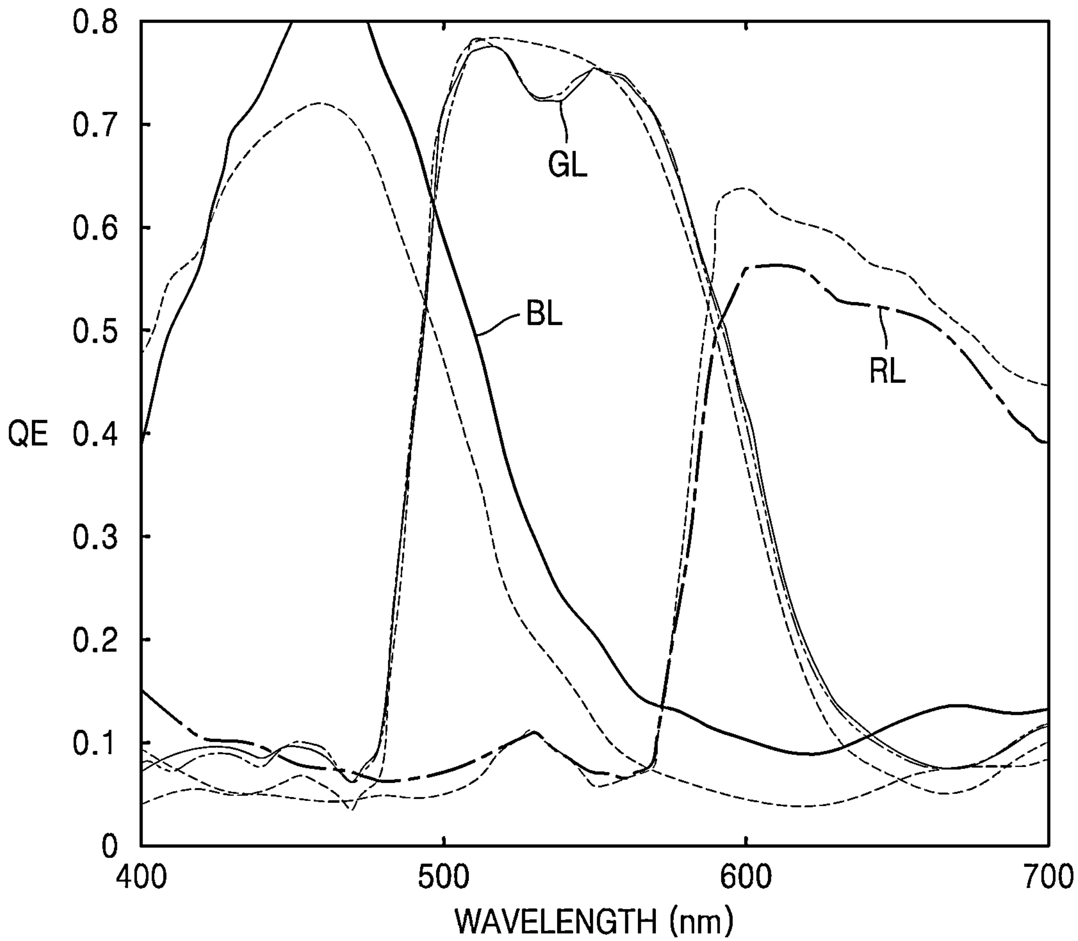
FIGS. 5A and 5B are computational simulation graphs showing spectrums of light sensed by an image sensor including a nano-optical micro lens according to comparative examples 1 and 2.
Figure 5B:
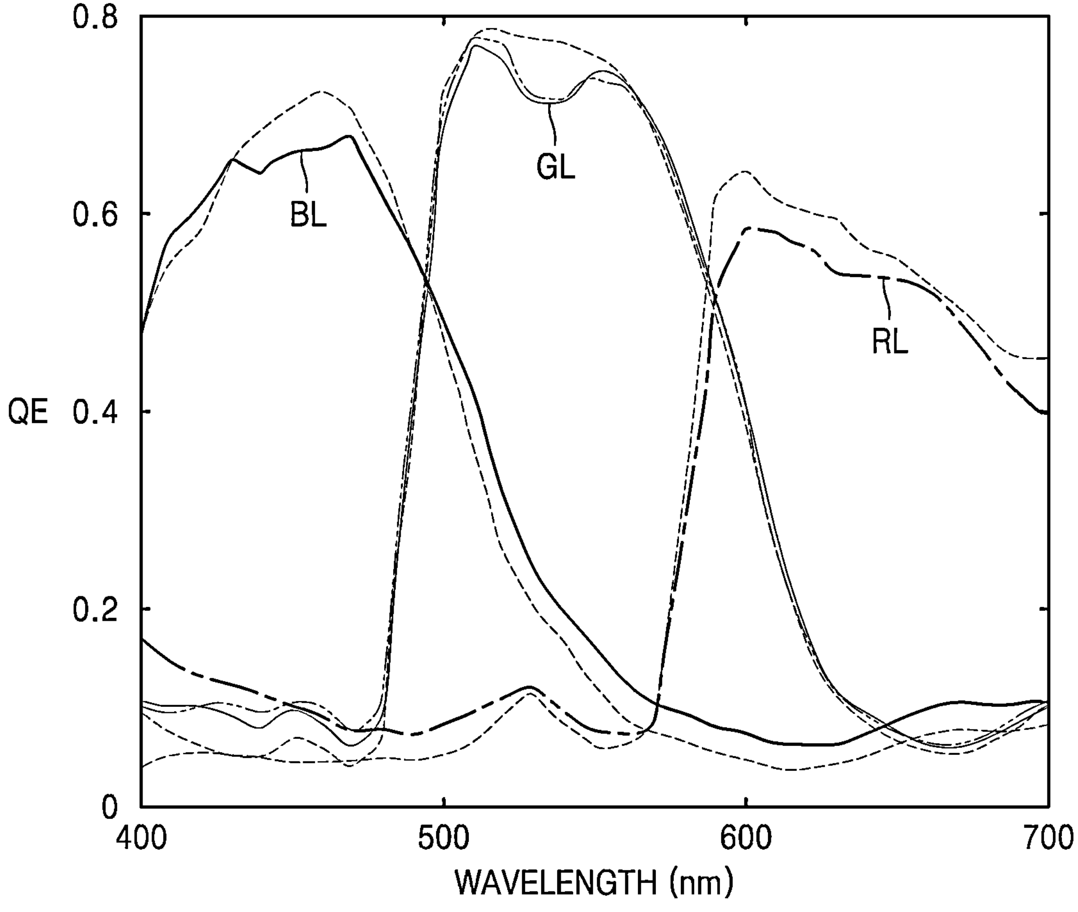
Figure 5C:
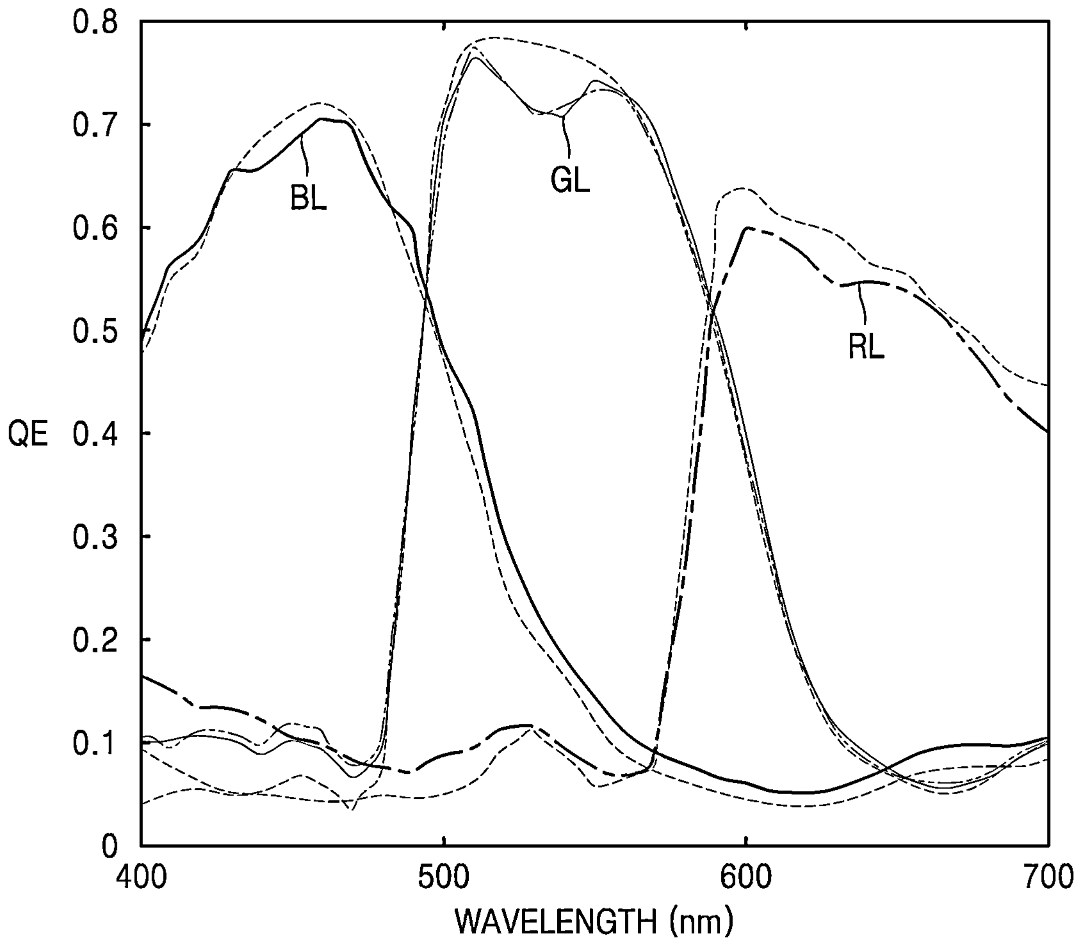
FIG. 5C is a computational simulation graph showing a spectrum of light sensed by an image sensor according to an embodiment.

FIGS. 5A, 5B, and 5C are computational simulation graphs showing spectrums of light sensed by an image sensor including a nano-optical micro-lens array according to comparative example 1, comparative example 2, and an embodiment, respectively.

In the graphs, RL, GL, and BL are the spectrums of red light, green light, and blue light, respectively, and dotted lines are the spectrum in a case where the image sensor includes a general micro lens array.

FIGS. 5A, 5B, and 5C show that the nano-optical micro-lens arrays of comparative examples 1, 2, and embodiment all exhibit quantum efficiency similar to the case where the image sensor includes the general micro lens array.

AF performance and crosstalk in the image sensor of comparative examples 1 and 2 and embodiment are shown in detail in the following table.

TABLE 1

| | Comparative Example 1 | Comparative Example 2 | Embodiment |
|---|---|---|---|
| AF | R 2.449 | R 2.901 | R 3.15 |
| (CR | Gb 1.893 | Gb 2.392 | Gb 3.078 |
| ratio) | Gr 2.905 | Gr 3.110 | Gr 3.559 |
| | B 2.168 | B 2.334 | B 2.314 |
| CTK | 23.6857 | 22.1148 | 21.3236 |

R, Gb, Gr, and B respectively indicate contrast ratios (CR ratios) in channels of a red pixel, a first green pixel, a second green pixel, and a blue pixel. The greater the contrast ratio, the greater the AF sensitivity, that is, the AF performance may be evaluated as improved. CTK is a numerical representation of a signal overlap between adjacent pixels, that is, crosstalk.

In the case of the embodiment, the crosstalk is small and the AF CR in each pixel is large compared to comparative examples 1 and 2.

Hereinafter, various examples of nano-optical micro-lens arrays capable of improving AF performance and reducing crosstalk are described.

Figure 6:
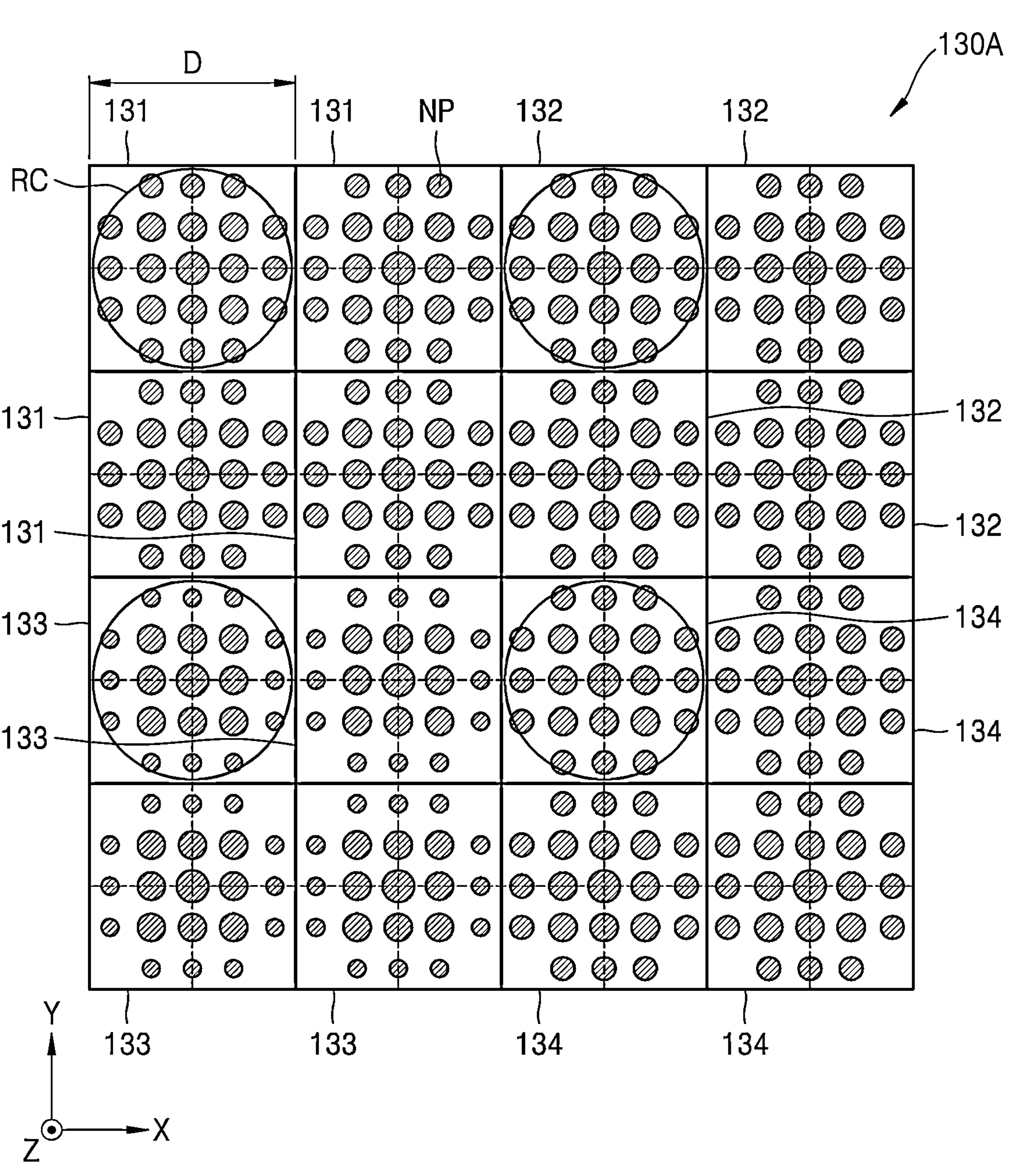
FIG. 6 is a plan view showing a structure of a nano-optical micro-lens array that may be provided in an image sensor according to an embodiment.

FIG. 6 is a plan view showing a structure of a nano-optical micro-lens array 130A that may be provided in an image sensor according to an embodiment.

The nano-optical micro-lens array 130A of the embodiment is different from the nano-optical micro-lens array 130 illustrated in FIG. 2D in the number of nanostructures NP included in each of the first to fourth nano-optical micro-lenses 131, 132, 133, and 134.

The nanostructures NP are arranged in a 5×5 matrix, and are not located at four corner positions, i.e., (1, 1), (1, 5), (5, 1), and (5, 5) on the 5×5 matrix, which are denoted as $X_1Y_1$, $X_1Y_5$, $X_5Y_1$, and $X_5Y_5$ in FIG. 6.

Figure 7:
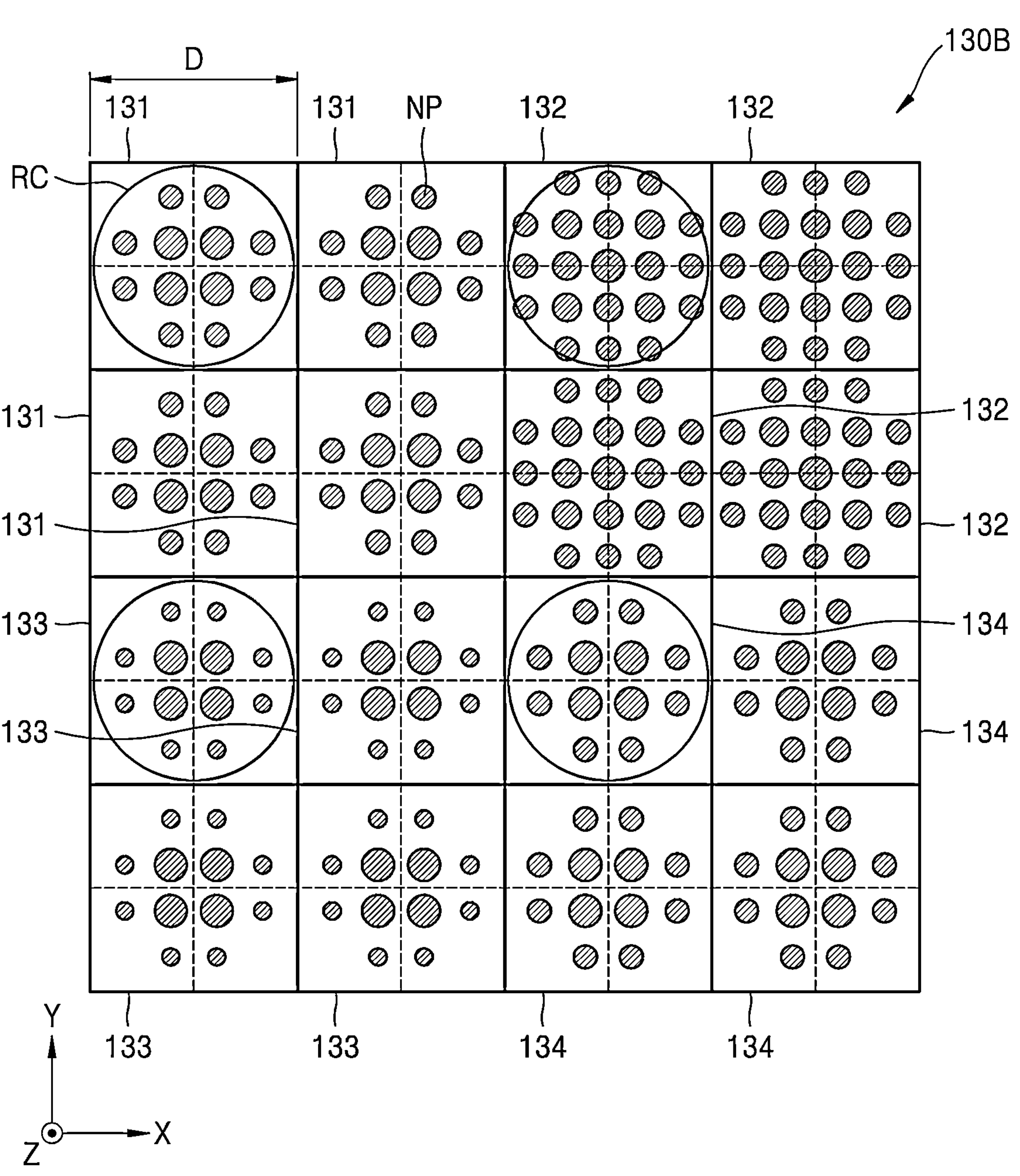
FIG. 7 is a plan view showing a structure of a nano-optical micro-lens array that may be provided in an image sensor according to an embodiment.

FIG. 7 is a plan view showing a structure of a nano-optical micro-lens array 130B that may be provided in an image sensor according to an embodiment.

The nano-optical micro-lens array 130B of the embodiment is different from the nano-optical micro-lens array 130 illustrated in FIGS. 2D and 6 in that the number of nanostructures NP provided in the second nano-optical micro-lens 132 is different from the number of nanostructures NP provided in each of the first, third, and fourth nano-optical micro-lenses 131, 133, and 134. The nanostructures NP of the second nano-optical micro-lens 132 are arranged based on 5×5, and the nanostructures NP of each of the first, third, and fourth nano-optical micro-lenses 131, 133, and 134 are arranged based on 4×4.

The number of nanostructures NP provided in each of the first to fourth nano-optical micro-lenses 131, 132, 133, and 134 illustrated in FIGS. 6 and 7 is an example and may be changed differently. For example, the nanostructures NP provided in each of the first to fourth nano-optical micro-lenses 131, 132, 133, and 134 may all have an arrangement based on 3×3, or an arrangement based on N×N, with N greater than 5. Alternatively, the number of nanostructures NP provided in the first, second, and third nano-optical micro-lenses 131, 132, and 133 may all be different. In this case, the number of nanostructures NP provided in the second nano-optical micro-lens 132 corresponding to a blue pixel is the largest, and the number of nanostructures NP provided in the third nano-optical micro-lens 133 corresponding to s red pixel may be the smallest. For example, the first nano-optical micro-lens 131 may be arranged based on 4×4, the second nano-optical micro-lens 132 may be arranged based on 5×5, and the third nano-optical micro-lens 133 may be arranged based on 3×3.

The arrangement of nanostructures NP in the nano-optical micro-lens arrays 130, 130A, and 130B illustrates one lens group. The arrangement of nanostructures NP may vary depending on a position of a lens group and a relative position of the lens group within the nano-optical micro-lens arrays 130, 130A, and 130B. This takes into account that a chief ray angle of light incident on the image sensor varies depending on a position.

Figure 8:
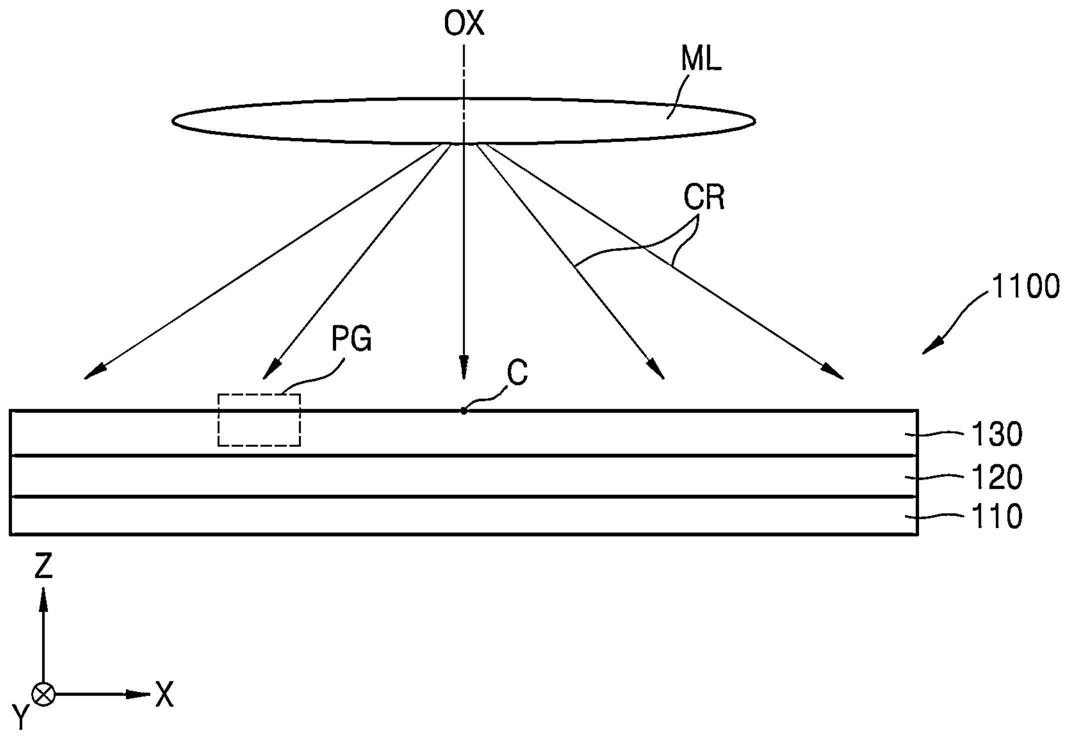
FIG. 8 is a conceptual diagram explaining a chief ray angle incident on a pixel array of an image sensor according to an embodiment.

FIG. 8 is a conceptual diagram explaining a chief ray angle incident on the pixel array 1100 of an image sensor according to an embodiment.

The pixel array 1100 of the image sensor may be employed in a camera module along with a module lens ML, and light directed to the pixel array 1100 through the module lens ML may have a different incident angle according to a position of the pixel array 1100. The incident angle of light incident on the pixel array 1100 may be represented by or defined as the chief ray angle CRA. A chief ray CR refers to a ray that starts from a point on a subject, passes through the center of the module lens ML, and is incident on the pixel array 1100, and the CRA refers to an angle formed by the chief ray CR with an optical axis OX.

The CRA of light incident on a center C of the nano-optical micro-lens array 130 is 0 degree, and the farther away from the center, that is, toward the periphery of the nano-optical micro-lens array 130, the greater the CRA of light incident on a lens group of the corresponding position. In addition, even when the CRA is the same, a direction of the chief ray changes depending on an azimuth position of the corresponding lens group. The azimuth angle may be defined as an angle formed with a reference direction on a plane perpendicular to the optical axis OX, for example, as an angle formed with an X direction on an X-Y plane.

Magnitude and direction of the CRA may be considered in an arrangement of nanostructures provided in the lens group included in the nano-optical micro-lens array 130. Hereinafter, a position where the CRA is 0 degree or close to 0 degree is referred to as a center, and other positions are referred to as a periphery, and the lens group located at the center of the nano-optical micro-lens array 130 is referred to as a center group and a lens group located at the periphery is referred to as a peripheral group PG. The position that may be considered as the center is not limited to the exact center position of the nano-optical micro-lens array 130, and may be defined as a position where the CRA is within a certain range. For example, a range of the center may be defined for convenience, such as the CRA is within 5%, within 10%, or within 20% of the maximum CRA.

Configuring the nano-optical micro-lens array 130 by distinguishing between the center and the periphery as described above considers that the nano-optical micro-lens array 130 operates efficiently with respect to light incident within a certain angle range, but when the incident angle is far from a specific angle range, the light condensing performance of the nano-optical micro-lens array 130 may deteriorate, and, the effects of improving AF performance or reducing crosstalk as described above may be reduced.

Figure 9A:
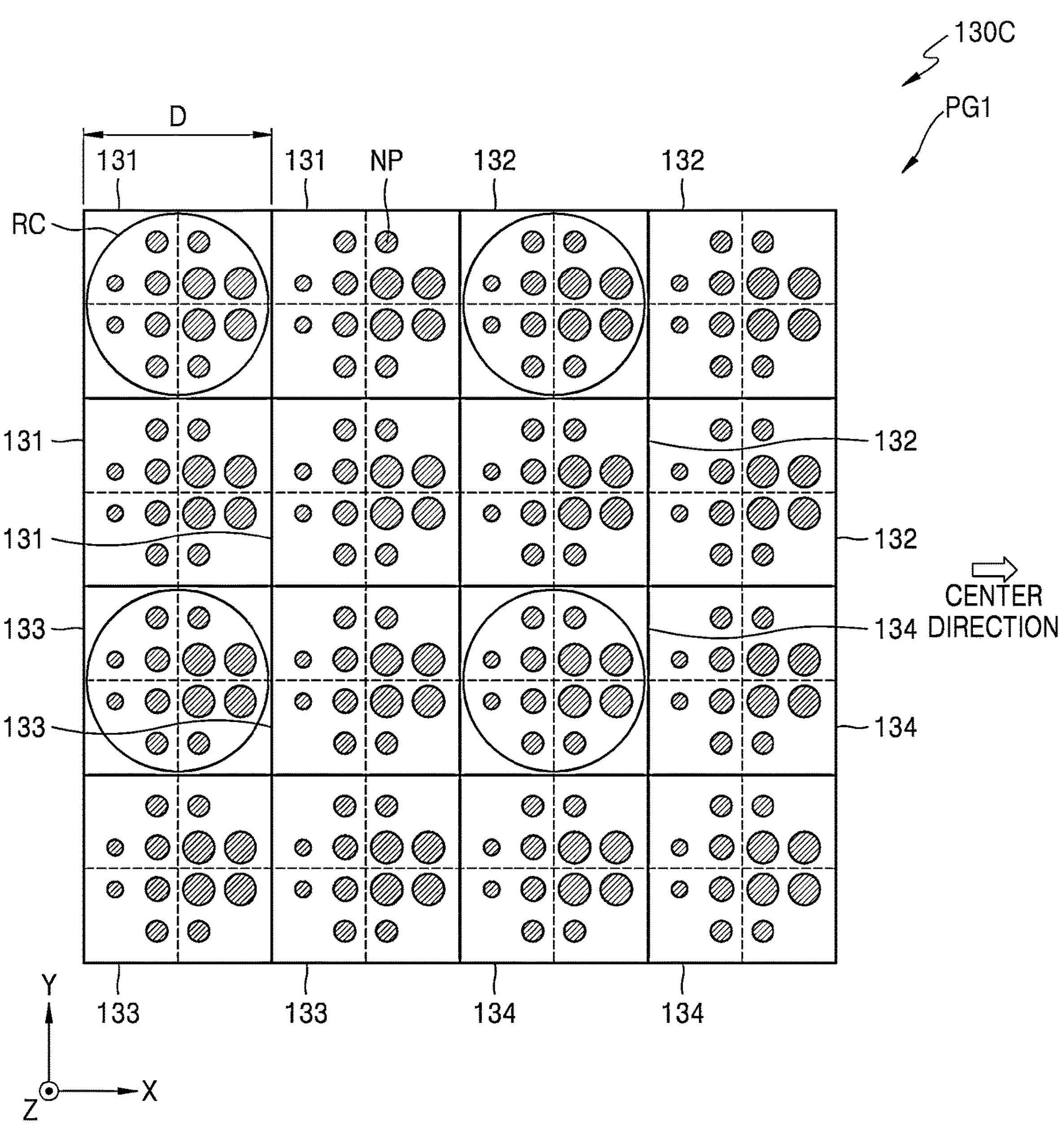
FIGS. 9A and 9B are plan views showing a structure of a nano-optical micro-lens array that may be provided in an image sensor according to an embodiment, seen from peripheral groups at different positions.
Figure 9B:
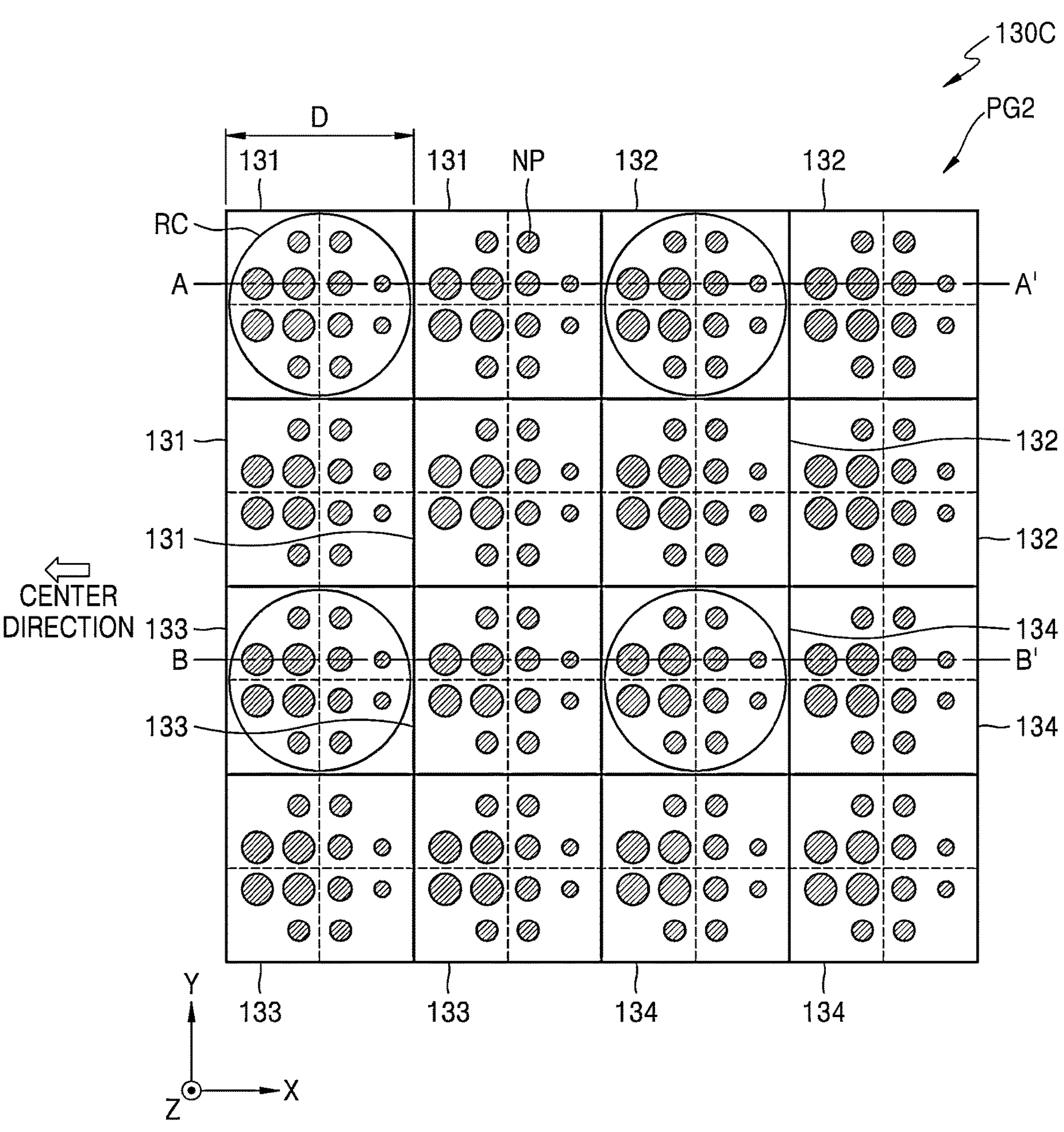

FIGS. 9A and 9B are plan views showing a structure of a nano-optical micro-lens array 130C that may be provided in an image sensor according to an embodiment, seen from peripheral groups PG1 and PG2 at different positions.

In FIG. 9A, the nano-optical micro-lens array 130C shows the peripheral group PG1, and, in FIG. 9B, the nano-optical micro-lens array 130C shows the peripheral group PG2. The peripheral group PG1 is a position with an azimuth of 180 degrees, and the peripheral group PG2 is a position with an azimuth of 0 degree.

The nanostructures NP disposed on the first to fourth nano-optical micro-lenses 131, 132, 133, and 134 included in the peripheral group PG1 may be arranged based on 4×4, and in second and third rows, the nanostructures NP are arranged in order of increasing size toward the center, that is, toward the right. The nanostructures NP are not located at the positions (1, 1), (1, 4), (4, 1), and (4, 4), similarly to the nano-optical micro-lens arrays 130, 130A, and 130B described above.

The nanostructures NP disposed on the first to fourth nano-optical micro-lenses 131, 132, 133, and 134 included in the peripheral group PG2 may be also arranged based on 4×4, and in second and third rows, the nanostructures NP are arranged in order of increasing size toward the center, that is, toward the left. The nanostructures NP are not located at the positions (1, 1), (1, 4), (4, 1), and (4, 4) similarly to the nano-optical micro-lens arrays 130, 130A, and 130B described above.

The lens groups provided in the nano-optical micro-lens array 130C have been described as the two peripheral groups PG1 and PG2, but similarly, in peripheral groups at other azimuth positions, the nanostructures NP may be arranged in order of increasing size toward the center. For example, at positions where the azimuth angles are 90 degrees and 270 degrees, the nanostructures NP in second and third columns may be arranged in order of increasing size toward the center.

Among the lens groups provided in the nano-optical micro-lens array 130C, a central lens group may have an arrangement of the nanostructures NP as described in FIG. 2D.

FIGS. 10A to 10D are plan views showing a structure of the nano-optical micro-lens array 130D that may be provided in an image sensor according to an embodiment, seen from peripheral groups PG1, PG2, PG3, and PG4 at different positions.

In the nano-optical micro-lens array 130D of the embodiment, the nanostructures NP of the first to fourth nano-optical micro-lenses 131, 132, 133, and 134 of lens groups at the periphery may not be located at only some of the four positions (1, 1), (1, N), (N, 1), and (N, N). In other words, the nanostructures NP may not be disposed at two positions among the four positions (1, 1), (1, N), (N, 1), and (N, N), and may be disposed at remaining $N^2-2$ positions. A combination of the two positions at which the nanostructures NP are not disposed may vary depending on an azimuth. Alternatively, the nanostructures NP may not be disposed at three positions among the four positions (1, 1), (1, N), (N, 1), and (N, N), and may be disposed at remaining $N^2-3$ positions. A combination of the three positions at which the nanostructures NP are not disposed may vary depending on an azimuth. Alternatively, the nanostructures NP may not be disposed at one among the four positions (1, 1), (1, N), (N, 1), and (N, N), and may be disposed at remaining $N^2-1$ positions. The one position at which the nanostructures NP are not disposed may vary depending on an azimuth.

Figure 10A:
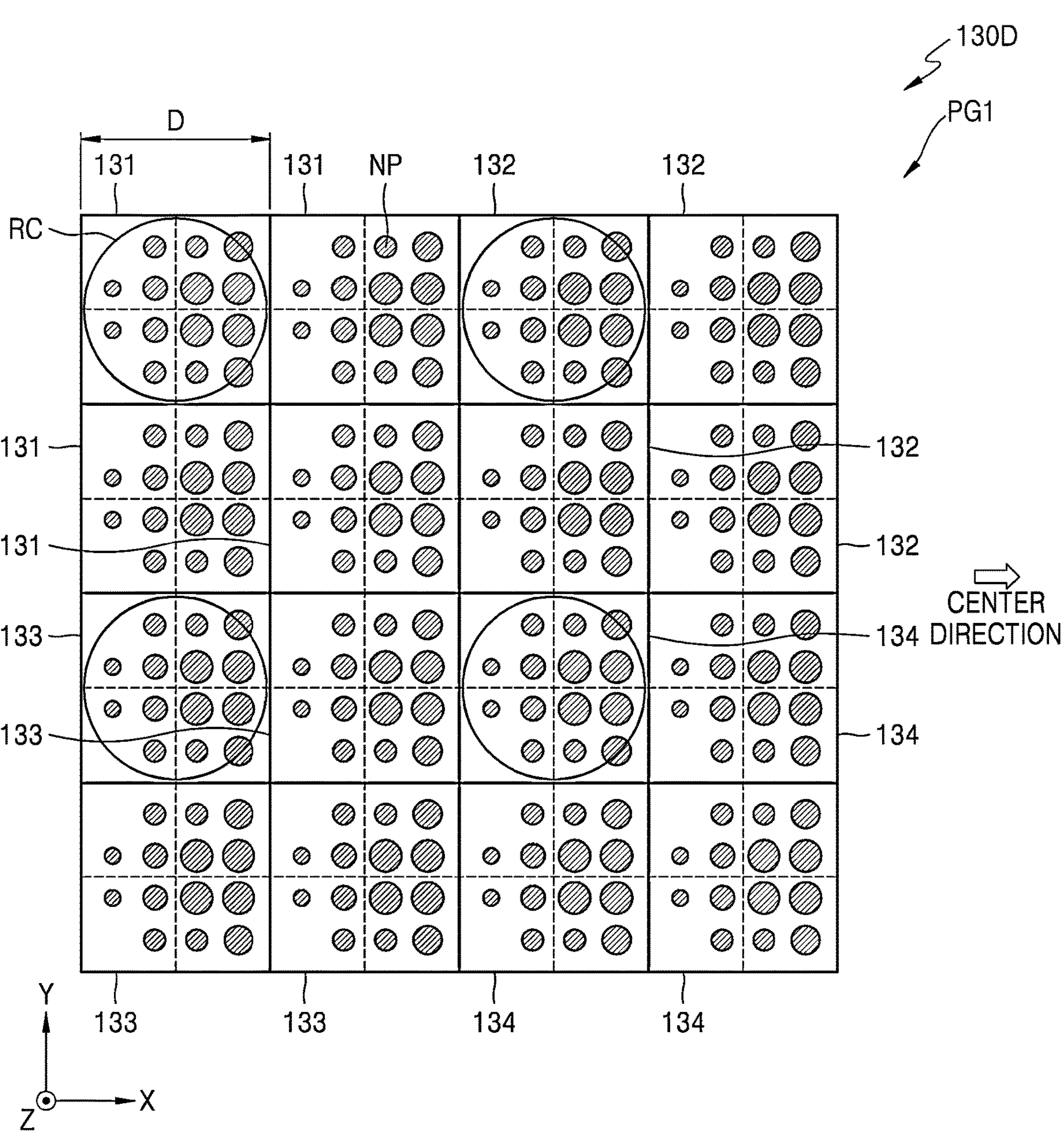
FIGS. 10A, 10B, 10C, and 10D are plan views showing a structure of a nano-optical micro-lens array that may be provided in an image sensor according to an embodiment, seen from peripheral groups at different positions.
Figure 10B:
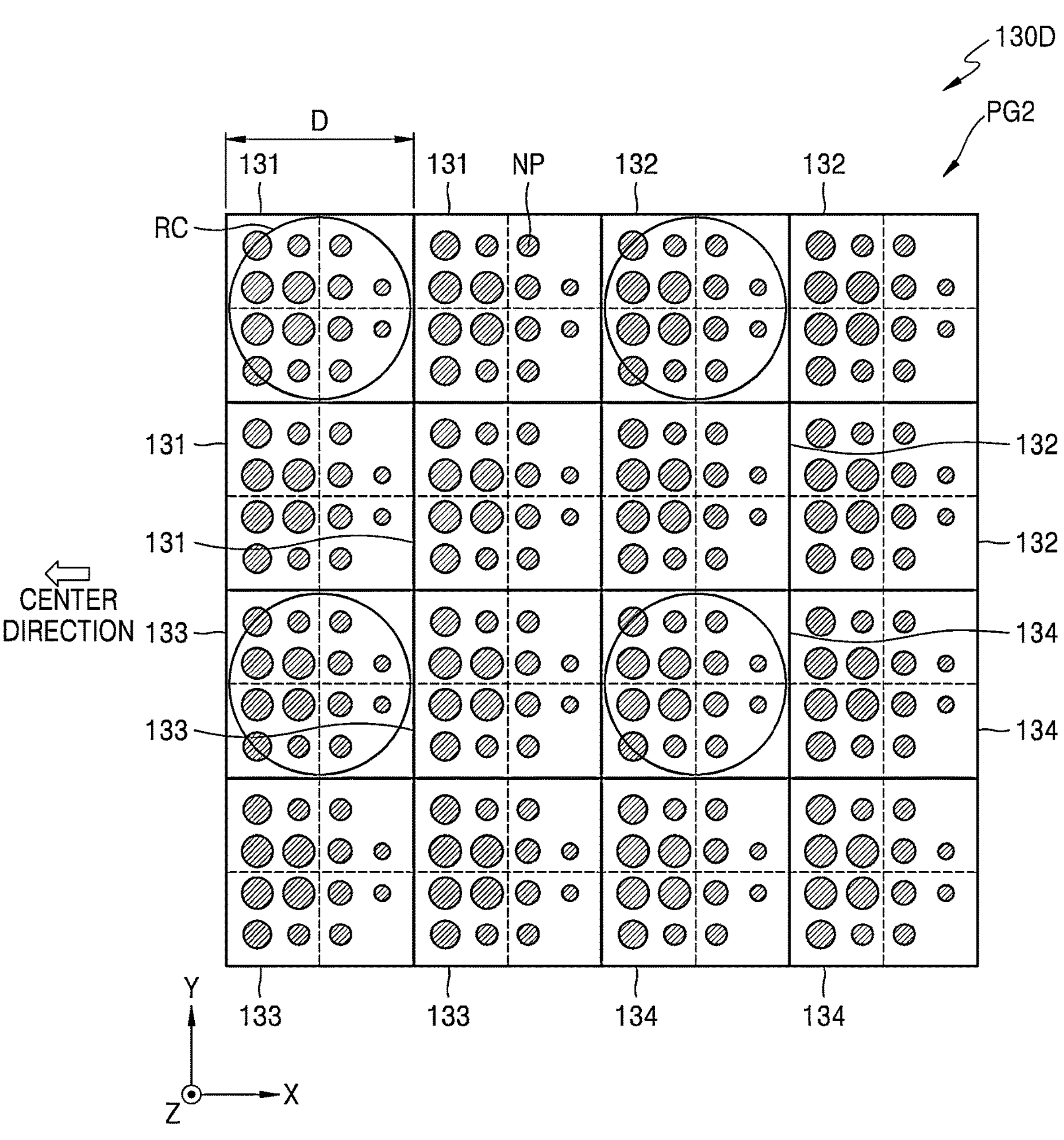
Figure 10C:
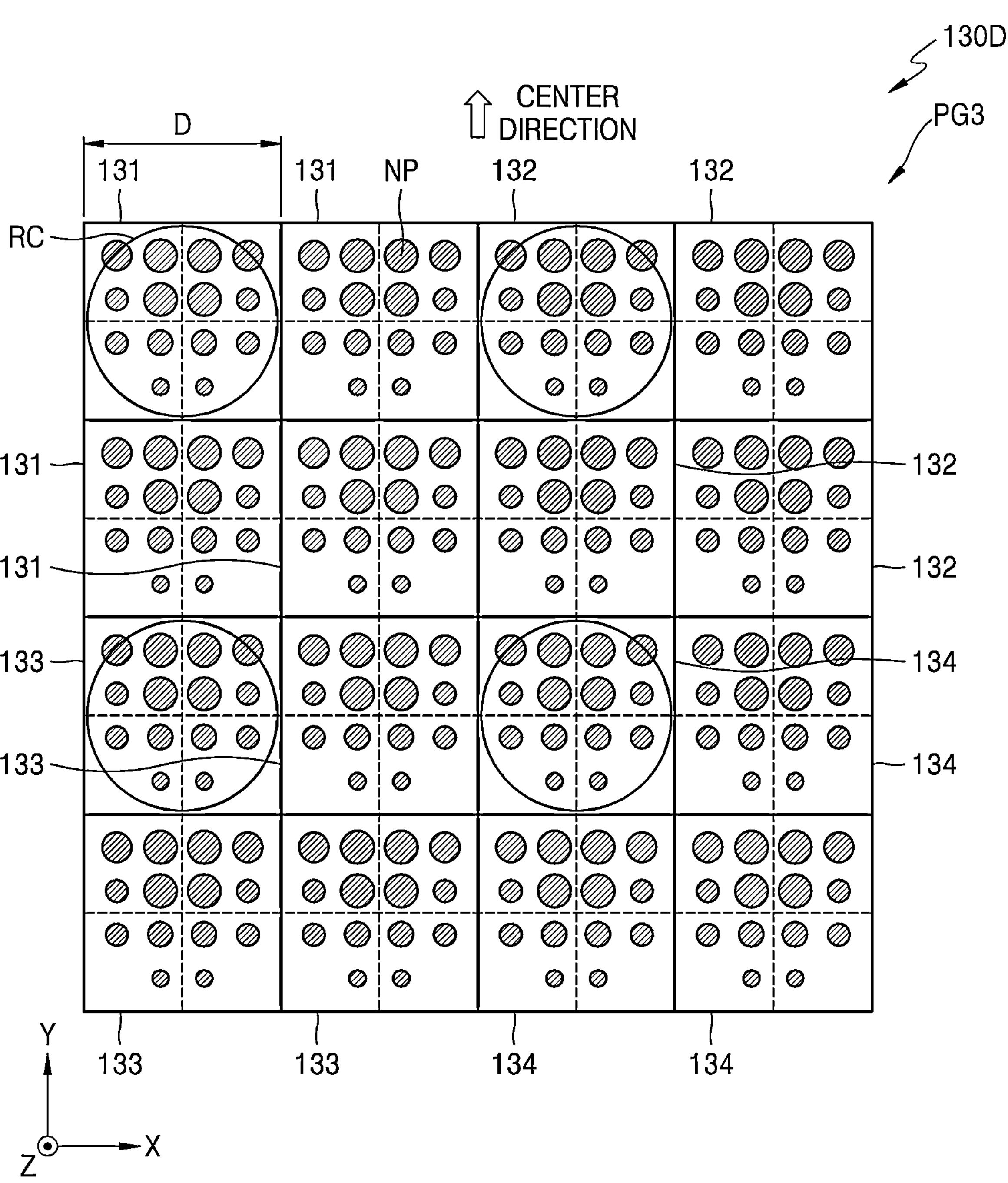
Figure 10D:
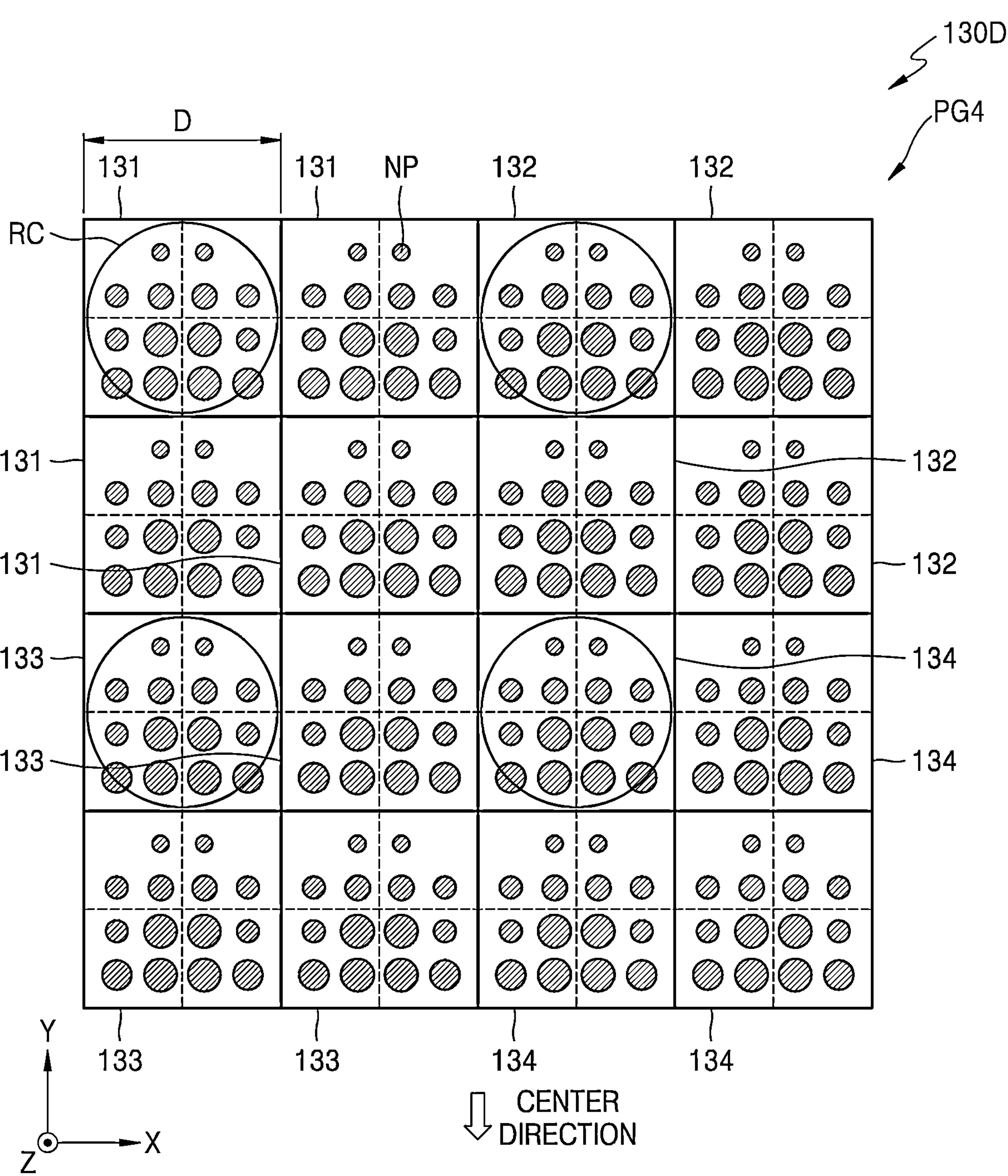

The peripheral groups PG1, PG2, PG3, and PG4 shown in FIG. 10A and FIG. 10D are positions with azimuth angles of 180 degrees, 0 degree, 270 degrees, and 90 degrees, respectively.

The first to fourth nano-optical micro-lenses 131, 132, 133, and 134 belong to the respective positions include rows or columns of the nanostructures NP arranged so that the sizes of the nanostructures NP increase toward the center. Specific positions at which the nanostructures NP are not disposed are different from each other depending on an azimuth.

With regard to the peripheral group PG1 of FIG. 10A with the azimuth angle of 180 degrees, the nanostructures NP are arranged to become larger to the right, that is, in a +X direction, which is the center direction, in the second and third rows, and the nanostructures NP are not disposed at the positions (1, 1) and (4, 1) and are disposed at the remaining 14 positions.

With regard to the peripheral group PG2 of FIG. 10B with the azimuth of 0 degree, the nanostructures NP are arranged to become larger to the left, that is, in a −X direction, which is the center direction, in the second and third rows, and the nanostructures NP are not disposed at the positions (1, 4) and (4, 4) and are disposed at the remaining 14 positions.

With regard to the peripheral group PG3 of FIG. 10C with the azimuth of 270 degrees, the nanostructures NP are arranged to become larger to upward, that is, in a +Y direction, which is the center direction, in the second and third columns, and the nanostructures NP are not disposed at the positions (4, 1) and (4, 4) and are disposed at the remaining 14 positions.

With regard to the peripheral group PG4 of FIG. 10D with the azimuth of 90 degrees, the nanostructures NP are arranged to become larger to downward, that is, in a −Y direction, which is the center direction, which is the center direction, in the second and third columns, and the nanostructures NP are not disposed at the positions (1, 1) and (1, 4) and are disposed at the remaining 14 positions.

In the case of peripheral groups with azimuth angles of 45 degrees, 135 degrees, 225 degrees, and 315 degrees, positions at which the nanostructures NP are not disposed may be determined in a manner similar to that described above. For example, the nanostructures NP may not be disposed at one of the four positions farthest from the center, and the nanostructures NP may be disposed at remaining $N^2-1$ positions. Alternatively, the nanostructure NP may not be disposed in three of the four positions except for one position closest to the center, and the nanostructures NP may be disposed at remaining $N^2-3$ positions.

In the above description, the arrangement of the nanostructures NP in each of the first to fourth nano-optical micro-lenses 131, 132, 133, and 134 is based on N×N where N is 4, as the same in all, but is not limited thereto. N may be 3 or 5 or more, or, similar to that described in FIG. 7, N in the second nano-optical micro-lens 132 may be different from N of each of the first, third, and fourth nano-optical micro-lenses 131, 133, and 134.

A central group of the nano-optical micro-lens array 130D may include the first to fourth nano-optical micro-lenses 131, 132, 133, and 134 as described in FIG. 2D.

As described above, the nanostructures NP of the first to fourth nano-optical micro-lenses 131, 132, 133, and 134 are arranged by dividing the center group and a peripheral group, and thus, a fill factor defined with the reference circle RC may be different between the central group and the peripheral group. For example, the fill factor of the peripheral group may be less than that of the central group. The fill factor of the peripheral group with a large CRA may be less than the fill factor of the peripheral group with a small CRA. The fill factor of the central group may be greater than 90%, greater than 95%, or nearly 100%. For example, the fill factor in the central group located at the center of the nano-optical micro-lens array 130 may be 100%.

Figure 11:
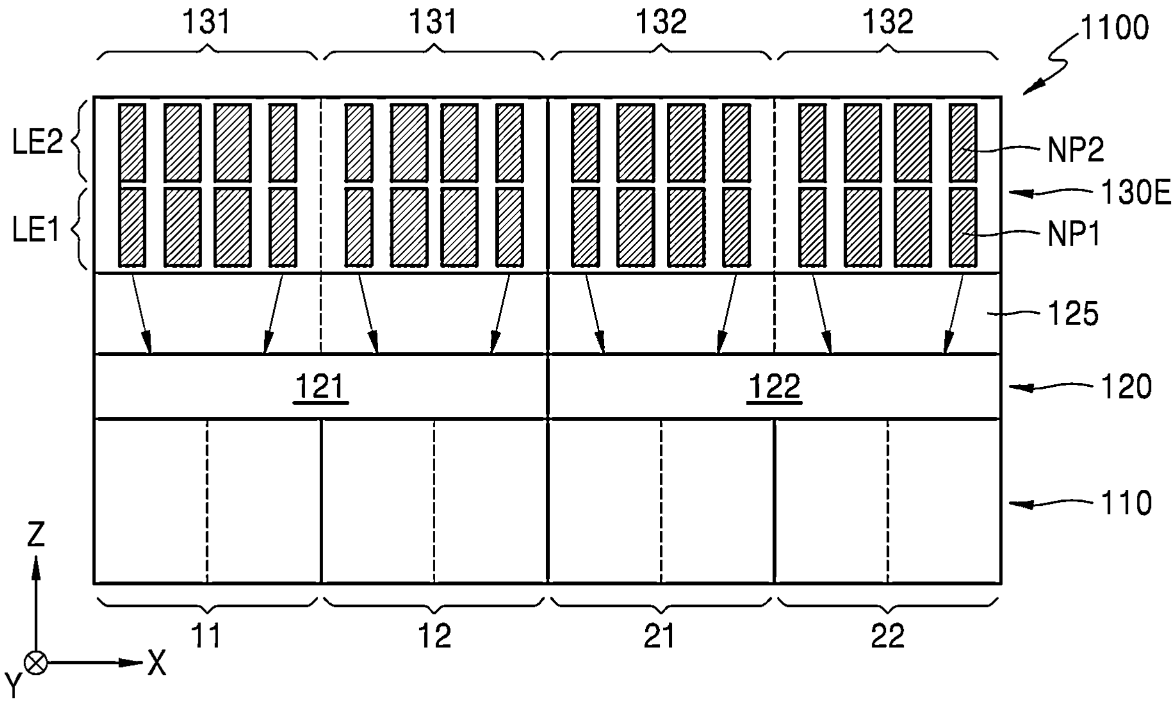
FIG. 11 is a cross-sectional view showing a pixel array including a nano-optical micro-lens array of another structure.

FIG. 11 is a cross-sectional view showing the pixel array 1100 including a nano-optical micro-lens array 130E of another structure.

The pixel array 1100 of the embodiment is different from a nano-optical micro-lens array described above in that the nano-optical micro-lens array 130E includes first nanostructures NP1 and second nanostructures NP2 which are arranged and divided into a first layer LE1 and a second layer LE2.

The arrangement of the nanostructure NP described above may be applied to both the first nanostructures NP1 of the first layer LE1 and the second nanostructures NP2 of the second layer LE2, or may be applied to only any one layer. For example, the arrangement of the nanostructure NP described above may be applied to only the second nanostructures NP2 of the second layer LE2.

The pixel array 1100 described above has a Tetra-Square arrangement as an example, but in another embodiment, the pixel array 1100 may have a different arrangement.

Figure 12A:
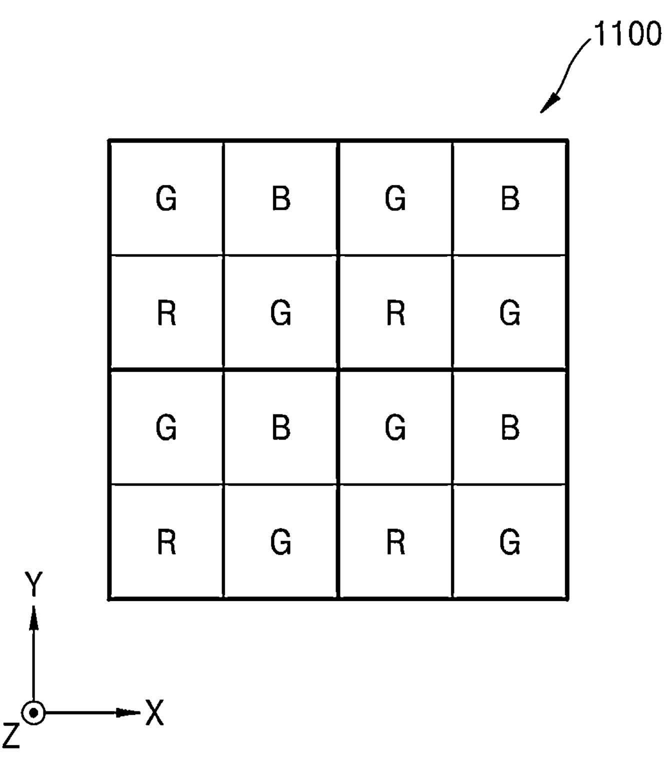
FIG. 12A is a plan view showing another example of a color arrangement of a pixel array in an image sensor.
Figure 12B:
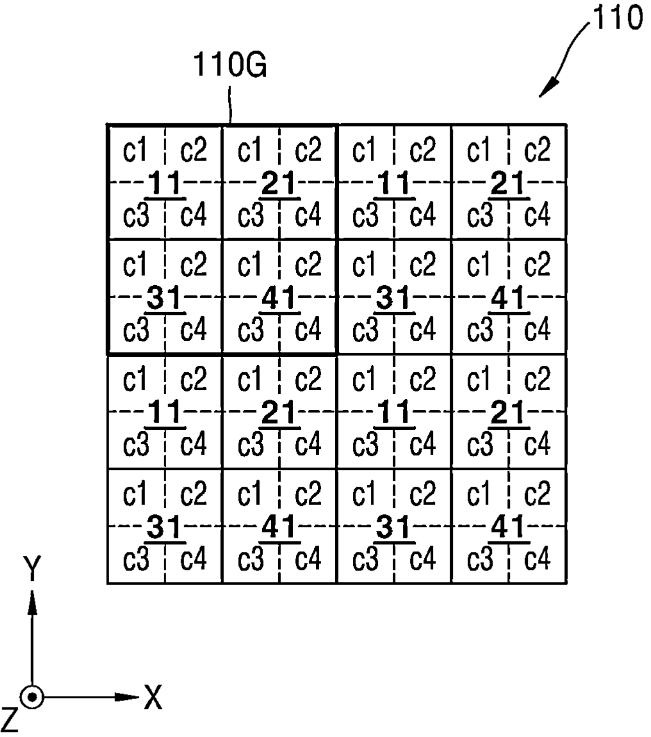
FIGS. 12B, 12C, and 12D are schematic plan views showing a sensor substrate, a color filter array, and a nano-optical micro lens array provided in the pixel array of FIG. 12A.
Figure 12C:
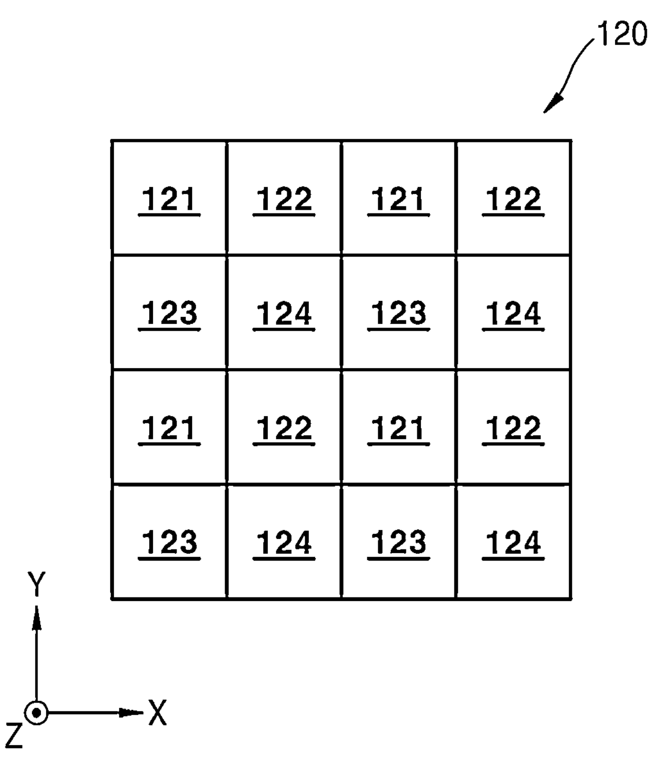
Figure 12D:
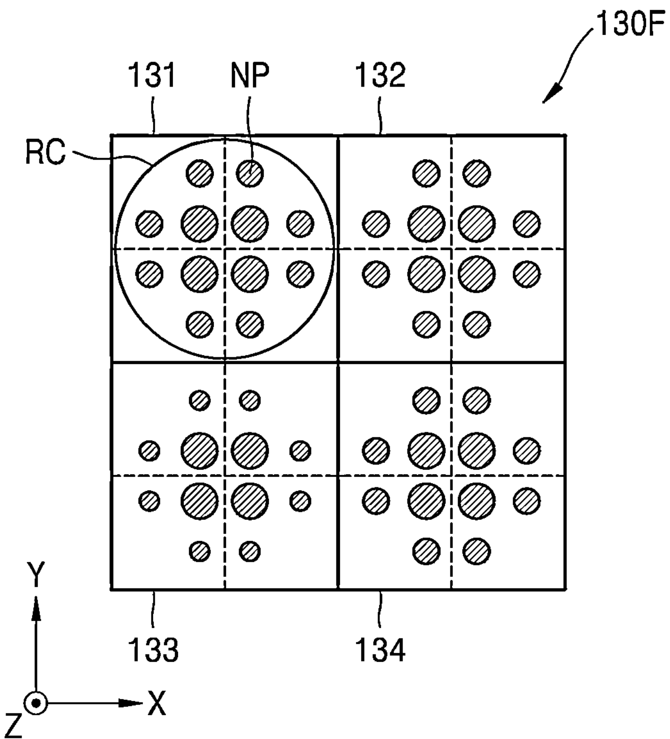

FIG. 12A is a plan view showing another example of a color arrangement of the pixel array 1100 in an image sensor, and FIGS. 12B, 12C, and 12D are schematic plan views showing a sensor substrate 110, a color filter array 120, and a nano-optical micro lens array 130F provided in the pixel array 1100 of FIG. 12A.

As shown in FIG. 12A, the pixel array 1100 may have the color arrangement of a general Bayer pattern. As shown in FIG. 12B, the sensor substrate 110 includes the plurality of unit pixel groups 110G, and each unit pixel group 110G includes the first to fourth pixels 11, 21, 31, and 41 in a 2×2 arrangement. The first to fourth pixels 11, 21, 31, and 41 may each include the four photosensitive cells c1, c2, c3, and c4 in a 2×2 arrangement. Referring to FIG. 12C, the color filter array 120 includes the first to fourth color filters 121, 122, 123, and 124 facing the first to fourth pixels 11, 21, 31, and 41, respectively. Referring to FIG. 12D, the nano-optical micro-lens array 130F includes the first to fourth nano-optical micro-lens arrays 131, 132, 133, and 134 facing the first to fourth pixels 11, 21, 31, and 41, respectively. That is, the nano-optical micro-lens array 130F of the embodiment is different from the nano-optical micro-lens array 130 described with reference to FIG. 2D in that one of each of the first to fourth nano-optical micro-lens 131, 132, 133, and 134 is included in one lens group.

The pixel array 1100 may be referred to as a quad cell (Qcell) structure. In the Qcell structure, each pixel is divided into four smaller sub-pixels which are called photosensitive cells (e.g., four photosensitive cells C1-C4 within a single pixel 11 in FIG. 2B), which independent operate and sense incident light. This arrangement offers enhanced light sensitivity and more accurate color reproduction compared to traditional Bayer filter arrays, which use a pattern of red, green, and blue filters over pixels.

As described above, a fill factor, a position at which the nanostructures NP are not disposed in an arrangement based on N×N, a relationship between N number and corresponding pixels, a difference in the arrangement of nanostructures NP in peripheral and central groups, a two-layer arrangement of the nanostructures NP, etc. may be equally applied to a pixel array of the Qcell-structure.

Figure 13:
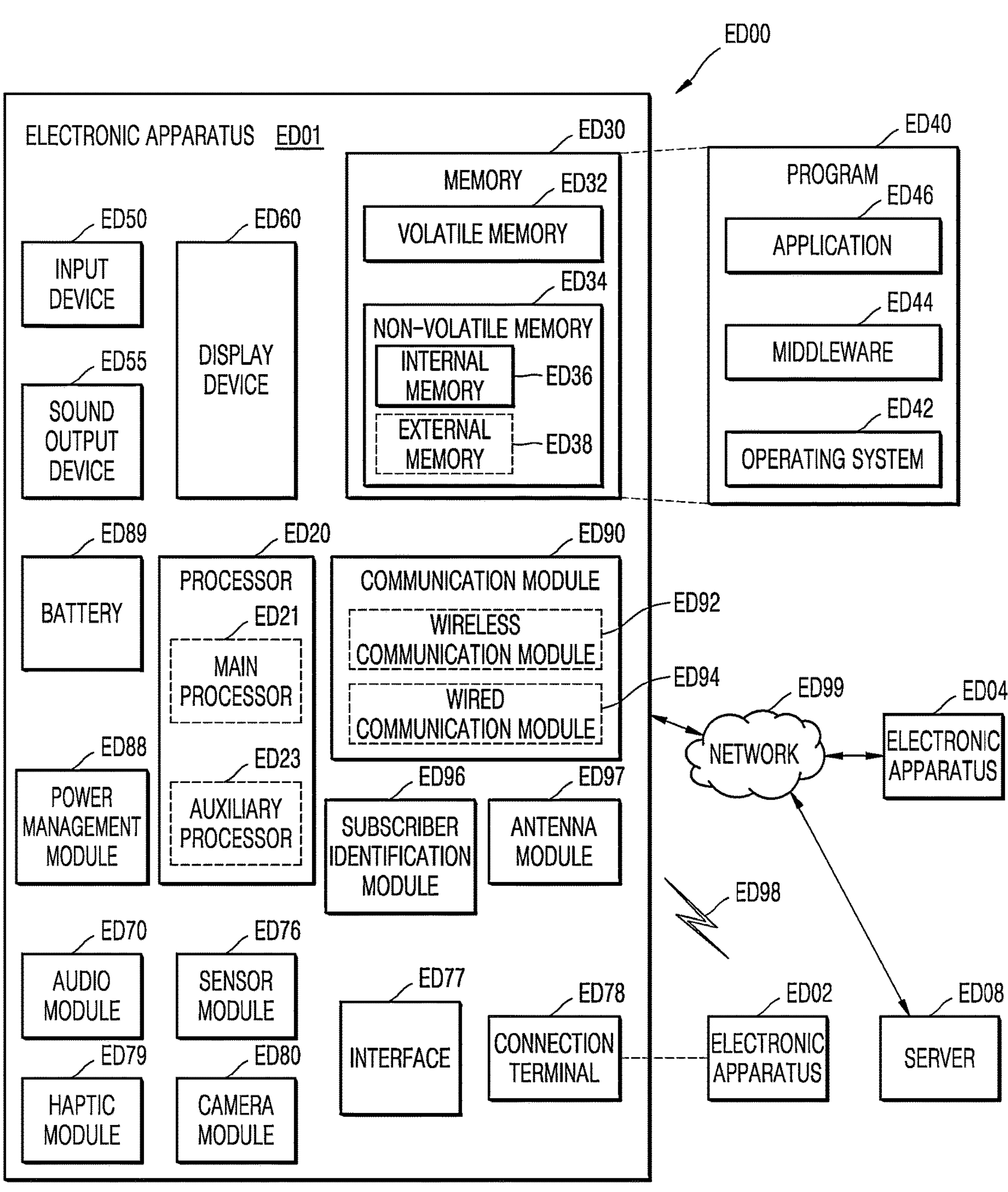
FIG. 13 is a schematic block diagram of an electronic apparatus including an image sensor according to some embodiments.
Figure 14:
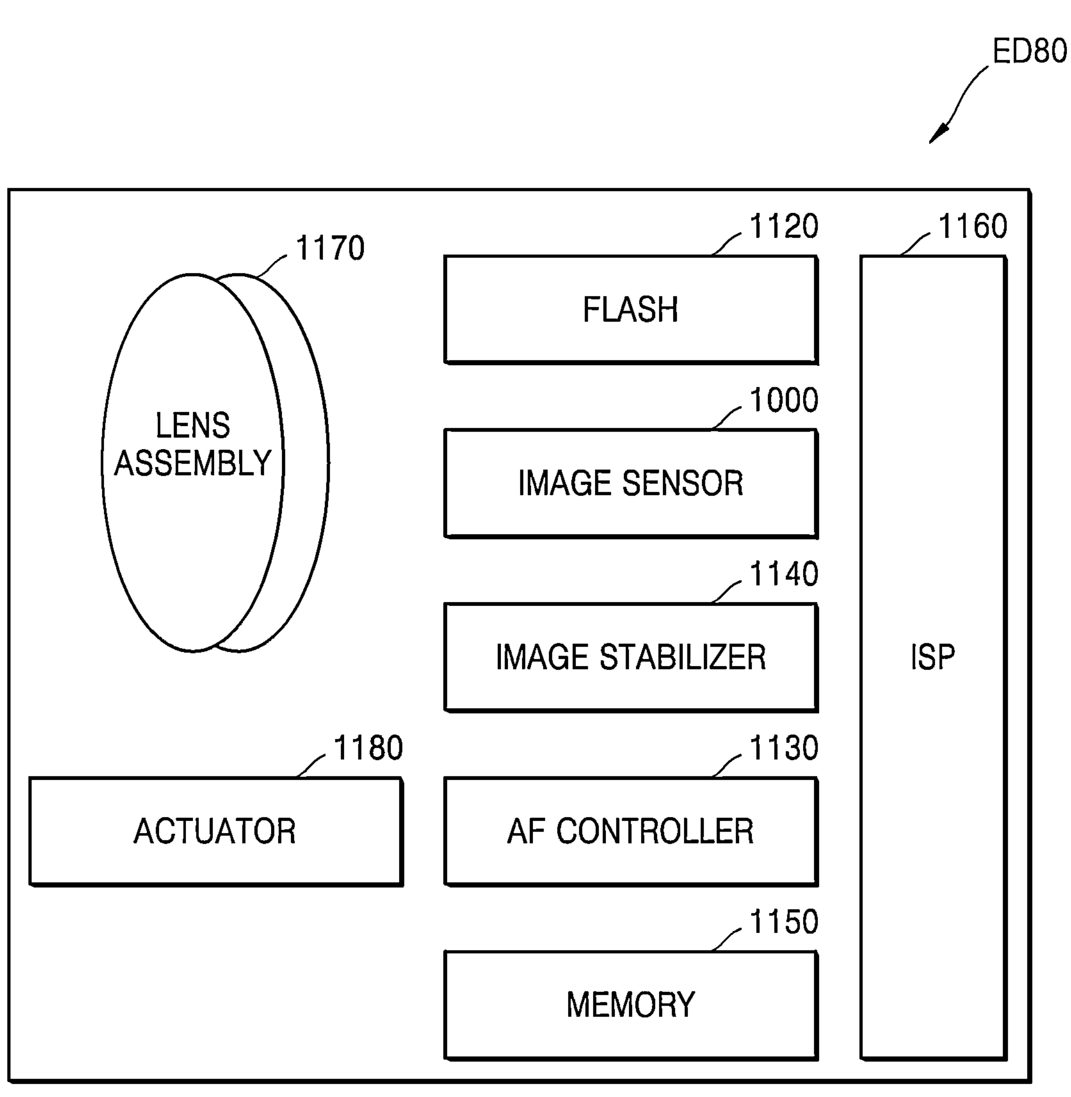
FIG. 14 is a schematic block diagram of a camera module included in the electronic apparatus of FIG. 13.

FIG. 13 is a schematic block diagram of an electronic apparatus ED01 including an image sensor according to some embodiments. FIG. 14 is a schematic block diagram of a camera module ED80 included in the electronic apparatus ED01 of FIG. 13.

Referring to FIG. 13, in a network environment ED00, the electronic apparatus ED01 may communicate with another electronic apparatus ED02 via a first network ED98 (e.g., a short-range wireless communication network, etc.), or may communicate with another electronic apparatus ED04 and/or a server ED08 via a second network ED99 (e.g. a long-range wireless communication network, etc.) The electronic apparatus ED01 may communicate with the electronic apparatus ED04 via the server ED08. The electronic apparatus ED01 may include a processor ED20, a memory ED30, an input device ED50, a sound output device ED55, a display device ED60, an audio module ED70, a sensor module ED76, an interface ED77, a haptic module ED79, the camera module ED80, a power management module ED88, a battery ED89, a communication module ED90, a subscriber identification module ED96, and/or an antenna module ED97. In the electronic apparatus ED01, some (e.g., a display device ED60, etc.) of the components may be omitted or another component may be added. Some of the components may be configured as one integrated circuit. For example, the sensor module ED76 (e.g., a fingerprint sensor, an iris sensor, an illuminance sensor, etc.) may be embedded and implemented in the display device ED60 (e.g., a display, etc.)

The processor ED20 may control one or more components (e.g., hardware, software components, etc.) of the electronic apparatus ED01 connected to the processor ED20 by executing software (e.g., program ED40, etc.), and may perform various data processes or operations. As a part of the data processing or operations, the processor ED20 may load a command and/or data received from another component (e.g., a sensor module ED76, a communication module ED90, etc.) to a volatile memory ED32, may process the command and/or data stored in the volatile memory ED32, and may store result data in a non-volatile memory ED34. The processor ED20 may include a main processor ED21 (e.g., a central processing unit, an application processor, etc.) and an auxiliary processor ED23 (e.g., a graphic processing unit, an image signal processor, a sensor hub processor, a communication processor, etc.) that may be operated independently from or along with the main processor ED21. The auxiliary processor ED23 may use less power than that of the main processor ED21, and may perform specified functions.

The auxiliary processor ED23, on behalf of the main processor ED21 while the main processor ED21 is in an inactive state (e.g., a sleep state) or along with the main processor ED21 while the main processor ED21 is in an active state (e.g., an application executed state), may control functions and/or states related to some (e.g., a display device ED60, a sensor module ED76, a communication module ED90, etc.) of the components in the electronic apparatus ED01. The auxiliary processor ED23 (e.g., an image signal processor, a communication processor, etc.) may be implemented as a part of another component (e.g., a camera module ED80, a communication module ED90, etc.) that is functionally related thereto.

The memory ED30 may store various data required by the components (e.g., a processor ED20, a sensor module ED76, etc.) of the electronic apparatus ED01. The data may include, for example, input data and/or output data about software (e.g., program ED40, etc.) and commands related thereto. The memory ED30 may include the volatile memory ED32 and/or the non-volatile memory ED34.

The program ED40 may be stored as software in the memory ED30, and may include an operation system ED42, middleware ED44, and/or an application ED46.

The input device ED50 may receive commands and/or data to be used in the components (processor ED20, etc.) of the electronic apparatus ED01, from outside (e.g., a user input, etc.) of the electronic apparatus ED01. The input device ED50 may include a microphone, a mouse, a keyboard, and/or a digital pen (e.g., a stylus pen).

The sound output device ED55 may output a sound signal to outside of the electronic apparatus ED01. The sound output device ED55 may include a speaker and/or a receiver. The speaker may be used for a general purpose such as multimedia reproduction or record play, and the receiver may be used to receive a call. The receiver may be coupled as a part of the speaker or may be implemented as an independent device.

The display device ED60 may provide visual information to outside of the electronic apparatus ED01. The display device ED60 may include a display, a hologram device, or a projector, and a control circuit for controlling the corresponding device. The display device ED60 may include a touch circuitry set to sense a touch, and/or a sensor circuit (e.g., a pressure sensor, etc.) that is set to measure a strength of a force generated by the touch.

The audio module ED70 may convert sound into an electrical signal or vice versa. The audio module ED 70 may acquire sound through the input device ED50, or may output sound via the sound output device ED55 and/or a speaker and/or a headphone of another electronic apparatus (e.g., an electronic apparatus ED02, etc.) connected directly or wirelessly to the electronic apparatus ED01.

The sensor module ED76 may sense an operating state (power, temperature, etc.) of the electronic apparatus ED01, or an outer environmental state (e.g., a user state, etc.), and may generate an electrical signal and/or data value corresponding to the sensed state. The sensor module ED76 may include a gesture sensor, a gyro-sensor, a pressure sensor, a magnetic sensor, an acceleration sensor, a grip sensor, a proximity sensor, a color sensor, an infrared (IR) ray sensor, a vivo sensor, a temperature sensor, a humidity sensor, and/or an illuminance sensor.

The interface ED77 may support one or more designated protocols that may be used in order for the electronic apparatus ED01 to be directly or wirelessly connected to another electronic apparatus (e.g., an electronic apparatus ED02, etc.) The interface ED77 may include a high-definition multimedia interface (HDMI), a universal serial bus (USB) interface, an SD card interface, and/or an audio interface.

The connection terminal ED78 may include a connector by which the electronic apparatus ED01 may be physically connected to another electronic apparatus (e.g., an electronic apparatus ED02, etc.). The connection terminal ED78 may include an HDMI connector, a USB connector, an SD card connector, and/or an audio connector (headphone connector, etc.).

The haptic module ED79 may convert the electrical signal into a mechanical stimulation (e.g., vibration, motion, etc.) or an electric stimulation that the user may sense through a tactile or motion sensation. The haptic module ED79 may include a motor, a piezoelectric device, and/or an electric stimulus device.

The camera module ED80 may capture a still image and a video. The camera module ED80 may include a lens assembly including one or more lenses, the image sensor 1000 described above, image signal processors, and/or flashes. The lens assembly included in the camera module ED80 may collect light emitted from an object that is an object to be captured.

The power management module ED88 may manage the power supplied to the electronic apparatus ED01. The power management module ED88 may be implemented as a part of a power management integrated circuit (PMIC).

The battery ED89 may supply electric power to components of the electronic apparatus ED01. The battery ED89 may include a primary battery that is not rechargeable, a secondary battery that is rechargeable, and/or a fuel cell.

The communication module ED90 may support the establishment of a direct (wired) communication channel and/or a wireless communication channel between the electronic apparatus ED01 and another electronic apparatus (e.g., electronic apparatus ED02, electronic apparatus ED04, server ED08, etc.), and execution of communication through the established communication channel. The communication module ED90 may be operated independently from the processor ED20 (e.g., an application processor, etc.), and may include one or more communication processors that support the direct communication and/or the wireless communication. The communication module ED90 may include a wireless communication module ED92 (e.g., a cellular communication module, a short-range wireless communication module, a global navigation satellite system (GNSS) communication module) and/or a wired communication module ED94 (e.g., a local area network (LAN) communication module, a power line communication module, etc.). From among the communication modules, a corresponding communication module may communicate with another electronic apparatus via a first network ED09 (e.g., a short-range communication network such as Bluetooth, WiFi direct, or infrared data association (IrDA)) or a second network ED99 (e.g., a long-range communication network such as a cellular network, Internet, or computer network (e.g., LAN, WAN, etc.)). Such above various kinds of communication modules may be integrated as one component (e.g., a single chip, etc.) or may be implemented as a plurality of components (e.g., a plurality of chips) separately from one another. The wireless communication module ED92 may identify and authenticate the electronic apparatus ED01 in a communication network such as the first network ED98 and/or the second network ED99 by using subscriber information (e.g., international mobile subscriber identifier (IMSI), etc.) stored in the subscriber identification module ED96.

The antenna module ED97 may transmit or receive the signal and/or power to/from outside (another electronic apparatus, etc.). An antenna may include a radiator formed as a conductive pattern formed on a substrate (e.g., a printed circuit board (PCB), a printed writing board (PWB), etc.). The antenna module ED97 may include one or more antennas. When the antenna module ED97 includes a plurality of antennas, from among the plurality of antennas, an antenna that is suitable for the communication type used in the communication network such as the first network ED98 and/or the second network ED99 may be selected by the communication module ED90. The signal and/or the power may be transmitted between the communication module ED90 and another electronic apparatus via the selected antenna. Another component (e.g., a radio-frequency integrated circuit (RFIC), etc.) other than the antenna may be included as a part of the antenna module ED97.

Some of the components may be connected to one another via the communication method among the peripheral devices (bus, general purpose input and output (GPIO), serial peripheral interface (SPI), mobile industry processor interface (MIPI), etc.) and may exchange signals (e.g., commands, data, etc.).

The command or data may be transmitted or received between the electronic apparatus ED01 and the external electronic apparatus ED04 via the server ED08 connected to the second network ED99. Other electronic apparatuses ED02 and ED04 may be the devices that are the same as or different kinds from the electronic apparatus ED01. All or some of the operations executed in the electronic apparatus ED01 may be executed in one or more devices among the other electronic apparatuses ED02, ED04, and ED08. For example, when the electronic apparatus ED01 has to perform a certain function or service, the electronic apparatus ED01 may request one or more other electronic apparatuses to perform some or entire function or service, instead of executing the function or service by itself. One or more electronic apparatuses receiving the request execute an additional function or service related to the request and may transfer a result of the execution to the electronic apparatus ED01. To do this, for example, a cloud computing, a distributed computing, or a client-server computing technique may be used.

Referring to FIG. 14, the camera module ED80 may include a lens assembly 1170, a flash 1120, an image sensor 1000, an image stabilizer 1140, an AF controller 1130, a memory 1150 (buffer memory, etc.), an actuator 1180, and/or an image signal processor (ISP) 1160.

The lens assembly 1170 may collect light emitted from an object that is to be captured. The lens assembly 1170 may include one or more optical lenses. The lens assembly 1170 may include a path switching member which switches the optical path toward the image sensor 1000. According to whether the path switching member is provided and the arrangement type with the optical lens, the camera module ED80 may have a vertical type or a folded type. The camera module ED80 may include a plurality of lens assemblies 1170, and in this case, the camera module ED80 may include a dual camera module, a 360-degree camera, or a spherical camera. Some of the plurality of lens assemblies 1170 may have the same lens properties (viewing angle, focal distance, autofocus, F number, optical zoom, etc.) or different lens properties. The lens assembly 1170 may include a wide-angle lens or a telephoto lens.

The actuator 1180 may drive the lens assembly 1170. At least some of the optical lens and the path switching member included in the lens assembly 1170 may be moved by the actuator 1180. The optical lens may be moved along the optical axis, and when the distance between adjacent lenses is adjusted by moving at least some of the optical lenses included in the lens assembly 1170, an optical zoom ratio may be adjusted.

The actuator 1180 may adjust the position of any one of the optical lenses in the lens assembly 1170 so that the image sensor 1000 may be located at the focal length of the lens assembly 1170. The actuator 1180 may drive the lens assembly 1170 according to an AF driving signal transferred from the AF controller 1130.

The flash 1120 may emit light that is used to strengthen the light emitted or reflected from the object. The flash 1120 may emit visible light or infrared-ray light. The flash 1120 may include one or more light-emitting diodes (red-green-blue (RGB) LED, white LED, infrared LED, ultraviolet LED, etc.), and/or a Xenon lamp. The image sensor 1000 may be the image sensor 1000 described above with reference to FIG. 1, and may include any one of the nano-optical micro-lens arrays 130, 130A, 130B, 130C, 130D, and 130E of various embodiments described above, or a combination or modified type thereof. The image sensor 1000 may obtain an image corresponding to a subject by converting the light emitted or reflected from the subject and transferred through the lens assembly 1170 into an electrical signal.

Also, each pixel of the image sensor 1000 may include a plurality of photosensitive cells, for example, arranged in a 2×2 shape, forming a plurality of channels. Some of the pixels may be used as AF pixels, and the image sensor 1000 may generate an AF driving signal from the signals from the plurality of channels in the AF pixels. In the nano-optical micro-lens arrays 130, 130A, 130B, 130C, 130D, or 130E included in the image sensor 1000, as described above, the nanostructure array type is set to improve AF performance and reduce crosstalk, and thus, the accuracy of AF driving may be improved.

The image stabilizer 1140, in response to a motion of the camera module ED80 or the electronic apparatus ED01 including the camera module ED80, moves one or more lenses included in the lens assembly 1170 or the image sensor 1000 in a certain direction or controls the operating characteristics of the image sensor 1000 (adjusting of a read-out timing, etc.) in order to compensate for a negative influence of the motion. The image stabilizer 1140 may sense the movement of the camera module ED80 or the electronic apparatus ED01 by using a gyro sensor or an acceleration sensor arranged in or out of the camera module ED80. The image stabilizer 1140 may be implemented as an optical type.

The AF controller 1130 may generate the AF driving signal from signal values sensed from the AF pixels in the image sensor 1000. The AF controller 1130 may control the actuator 1180 according to the AF driving signal.

The memory 1150 may store some or entire data of the image obtained through the image sensor 1000 for a next image processing operation. For example, when a plurality of images are obtained at a high speed, obtained original data (Bayer-patterned data, high resolution data, etc.) is stored in the memory 1150, and a low resolution image is only displayed. Then, original data of a selected image (user selection, etc.) may be transferred to the image signal processor 1160. The memory 1150 may be integrated with the memory ED30 of the electronic apparatus ED01, or may include an additional memory that is operated independently.

The ISP 1160 may perform image treatment on the image obtained through the image sensor 1000 or the image data stored in the memory 1150. The image treatments may include a depth map generation, a three-dimensional modeling, a panorama generation, extraction of features, an image combination, and/or an image compensation (noise reduction, resolution adjustment, brightness adjustment, blurring, sharpening, softening, etc.). The image signal processor 1160 may perform controlling (exposure time control, read-out timing control, etc.) of the components (image sensor 1000, etc.) included in the camera module ED80. The image processed by the image signal processor 1160 may be stored again in the memory 1150 for additional process, or may be provided to an external component of the camera module ED80 (e.g., the memory ED30, the display device ED60, the electronic apparatus ED02, the electronic apparatus ED04, the server ED08, etc.). The image signal processor 1160 may be integrated with the processor ED20, or may be configured as an additional processor that is independently operated from the processor ED20. When the image signal processor 1160 is configured as an additional processor separately from the processor ED20, the image processed by the image signal processor 1160 undergoes through an additional image treatment by the processor ED20 and then may be displayed on the display device ED60.

The AF controller 1130 may be integrated with the image signal processor 1160. The image signal processor 1160 may generate the AF signal by processing signals from the AF pixels of the image sensor 1000, and the AF controller 1130 may convert the AF signal into a driving signal of the actuator 1180 and transfer the signal to the actuator 1180.

The electronic apparatus ED01 may further include one or a plurality of camera modules having different properties or functions. The camera module may include components similar to those of the camera module ED80 of FIG. 14, and the image sensor included in the camera module may be implemented as a charge coupled device (CCD) sensor and/or a complementary metal oxide semiconductor (CMOS) sensor and may include one or a plurality of sensors selected from the image sensors having different properties, such as an RGB sensor, a black and white (BW) sensor, an IR sensor, or a UV sensor. In this case, one of the plurality of camera modules ED80 may include a wide-angle camera and another camera module ED80 may include a telephoto camera. Similarly, one of the plurality of camera modules ED80 may include a front camera and another camera module ED80 may include a rear camera.

The image sensor 1000 according to some embodiments may be applied to various electronic apparatuses.

The image sensor 1000 according to some embodiments may be applied to a mobile phone or a smartphone, a tablet or a smart tablet, a digital camera or a camcorder, a laptop computer, or a television or a smart television. For example, the smartphone or the smart tablet may include a plurality of high-resolution cameras each including a high-resolution image sensor. Depth information of objects in an image may be extracted, out focusing of the image may be adjusted, or objects in the image may be automatically identified by using the high-resolution cameras.

Also, the image sensor 1000 may be applied to a smart refrigerator, a surveillance camera, a robot, a medical camera, etc. For example, the smart refrigerator may automatically recognize food in the refrigerator by using the image sensor, and may notify the user of an existence of a certain kind of food, kinds of food put into or taken out, etc. through a smartphone. Also, the surveillance camera may provide an ultra-high-resolution image and may allow the user to recognize an object or a person in the image even in a dark environment by using high sensitivity. The robot may be input to a disaster or industrial site that a person may not directly access, to provide the user with high-resolution images. The medical camera may provide high-resolution images for diagnosis or surgery, and may dynamically adjust a field of view.

Also, the image sensor 1000 may be applied to a vehicle. The vehicle may include a plurality of vehicle cameras arranged on various positions. Each of the vehicle cameras may include the image sensor according to an embodiment. The vehicle may provide a driver with various information about inside the vehicle or around the vehicle by using the plurality of vehicle cameras, and may automatically recognize an object or a person in the image to provide information required to the autonomous travel.

The image sensor including the nano-optical micro-lens array described above may exhibit improved autofocus performance and reduce crosstalk between adjacent pixels.

The image sensor including the nano-optical micro-lens array described above may reduce performance degradation according to the chief ray angle.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art

What is claimed is:

1. An image sensor comprising:

a sensor substrate comprising a plurality of pixels configured to sense incident light;

a nano-optical micro-lens array comprising a plurality of nano-optical micro-lenses respectively corresponding to the plurality of pixels; and a color filter array disposed between the sensor substrate and the nano-optical micro-lens array and comprising a plurality of color filters, wherein each of the plurality of nano-optical micro-lenses comprises a plurality of nanostructures to condense the incident light onto a corresponding pixel, and when viewed in a cross-section of the nano-optical micro-lens array, a fill factor denotes a ratio of an area of the nanostructures arranged within a reference circle among the plurality of nanostructures included in one of the plurality of nano-optical micro-lenses, and the reference circle has a pixel size corresponding to the one nano-optical micro-lens as a diameter, the fill factor is greater than or equal to 95%, wherein the plurality of nanostructures are arranged on a two-dimensional plane that is perpendicular to a direction in which the sensor substrate, the color filter, and the nano-optical micro-lens array are arranged, and when positions at which the plurality of nanostructures are arranged in a form of an N×N matrix on the two-dimensional plane, the nanostructures are absent from one or more positions among four positions of (1, 1), (1, N), (N, 1), and (N, N), wherein N is an integer that is greater than or equal to 3.

2. The image sensor of claim 1, wherein, among the plurality of nano-optical micro-lenses, the fill factor of the nano-optical micro-lens located at a centralmost point of the nano-optical micro-lens array is 100%.

3. The image sensor of claim 1, wherein each of the plurality of pixels comprises four light photosensitive cells in a 2×2 arrangement.

4. The image sensor of claim 1, wherein, among the plurality of nano-optical micro-lenses, the plurality of nanostructures included in the nano-optical micro-lens located at a center of the nano-optical micro-lens array are absent from the four positions of (1, 1), (1, N), (N, 1), and (N, N) of the N×N matrix and occupy remaining $N^2-4$ positions.

5. The image sensor of claim 1, wherein, when the plurality of nano-optical micro-lenses are divided into a center and a periphery according to relative positions within the nano-optical micro-lens array, the plurality of nanostructures included in one nano-optical micro-lens located at the periphery are arranged in an order of increasing size toward the center in one row or one column.

6. The image sensor of claim 1, wherein, when the plurality of nano-optical micro-lenses are divided into a center and a periphery according to relative positions within the nano-optical micro-lens array, among the plurality of nano-optical micro-lenses belonging to the periphery, in two nano-optical micro-lenses having different azimuth angles defined in the two-dimensional plane, positions at which the nanostructures are absent differ among the four positions of (1, 1), (1, N), (N, 1), and (N, N).

7. The image sensor of claim 1, wherein, when the plurality of nano-optical micro-lenses are divided into a center and a periphery according to relative positions within the nano-optical micro-lens array, among the plurality of nano-optical micro-lenses belonging to the periphery, in the nano-optical micro-lens having an azimuth angle of 0 degree defined in the two-dimensional plane, the nanostructures are absent from the positions (1, N) and (N, N).

8. The image sensor of claim 1, wherein, when the plurality of nano-optical micro-lenses are divided into a center and a periphery according to relative positions within the nano-optical micro-lens array, among the plurality of nano-optical micro-lenses belonging to the periphery, in the nano-optical micro-lens having an azimuth angle of 90 degrees defined in the two-dimensional plane, the nanostructures are absent from the positions of (1, 1) and (1, N).

9. The image sensor of claim 1, wherein, when the plurality of nano-optical micro-lenses are divided into a center and a periphery according to relative positions within the nano-optical micro-lens array, among the plurality of nano-optical micro-lenses belonging to the periphery, in the nano-optical micro-lens having an azimuth angle of 180 degrees defined in the two-dimensional plane, the nanostructures are absent from the positions of (1, 1) and (N, 1).

10. The image sensor of claim 1, wherein, when the plurality of nano-optical micro-lenses are divided into a center and a periphery according to relative positions within the nano-optical micro-lens array, among the plurality of nano-optical micro-lenses belonging to the periphery, in the nano-optical micro-lens having an azimuth angle of 270 degrees defined in the two-dimensional plane, the nanostructures are absent from the positions of (N, 1) and (N, N).

11. The image sensor of claim 1, wherein, when the plurality of nano-optical micro-lenses are divided into a center and a periphery according to relative positions within the nano-optical micro-lens array, the fill factor of the nano-optical micro-lens at the center is greater than the fill factor of the nano-optical micro-lens at the periphery.

12. The image sensor of claim 1, wherein the plurality of nano-optical micro lenses comprise a first nano-optical micro-lens facing a green filter;

a second nano-optical micro-lens facing a blue filter; and a third nano-optical micro-lens facing a red filter.

13. The image sensor of claim 12, wherein a fill factor of the second nano-optical micro-lens is less than a fill factor of the first nano-optical micro-lens or the third nano-optical micro-lens.

14. The image sensor of claim 12, wherein a number of nanostructures included in the second nano-optical micro-lens is greater than a number of nanostructures included in the first nano-optical micro-lens or the third nano-optical micro-lens.

15. The image sensor of claim 1, wherein the plurality of pixels comprise first to fourth pixel groups adjacent in a 2×2 arrangement, each of the first to fourth pixel groups comprises four first to fourth pixels adjacent in the 2×2 arrangement, the plurality of nano-optical micro-lenses comprise four first to fourth nano-optical micro-lenses respectively corresponding to the four first to fourth pixels adjacent in the 2×2 arrangement, the color filter array comprises a first green filter, a blue filter, a red filter, and a second green filter, and the first green filter, the blue filter, the red filter, and the second green filter respectively face the first to fourth pixel groups one-to-one.

16. The image sensor of claim 1, wherein the plurality of pixels comprise first to fourth pixels adjacent in a 2×2 arrangement, each of the first to fourth pixels includes four photosensitive cells in the 2×2 arrangement, the plurality of nano-optical micro-lenses comprise first to fourth nano-optical micro-lenses facing the first to fourth pixels, respectively, the color filter array comprises a first green filter, a blue filter, a red filter, and a second green filter, and the first green filter, the blue filter, the red filter, and the second green filter respectively face the first to fourth pixels one-to-one.

17. An electronic apparatus comprising:

a lens assembly comprising one or more lenses to form an optical image of a subject;

the image sensor according to claim 1, wherein the image sensor is configured to convert the optical image into an electrical signal; and a processor configured to process the electrical signal generated by the image sensor.

18. An image sensor comprising:

a sensor substrate comprising a plurality of pixels configured to sense incident light;

a nano-optical micro-lens array comprising a plurality of nano-optical micro-lenses respectively corresponding to the plurality of pixels; and a color filter array disposed between the sensor substrate and the nano-optical micro-lens array and comprising a plurality of color filters, wherein each of the plurality of nano-optical micro-lenses comprises a plurality of nanostructures to condense the incident light onto a corresponding pixel, when the plurality of nanostructures are arranged in a form of an N×N matrix on a two-dimensional plane, in the nano-optical micro-lens disposed at a center of the nano-optical micro-lens array, the plurality of nanostructures are absent from four positions of (1, 1), (1, N), (N, 1), and (N, N) and are disposed at remaining $N^2-4$ positions, and wherein N is an integer that is greater than or equal to 3.

19. An image sensor comprising:

a sensor substrate comprising a plurality of pixels configured to sense incident light;

a nano-optical micro-lens array comprising a plurality of nano-optical micro-lenses respectively corresponding to the plurality of pixels; and a color filter array disposed between the sensor substrate and the nano-optical micro-lens array and comprising a plurality of color filters, wherein each of the plurality of nano-optical micro-lenses comprises a plurality of nanostructures to condense the incident light onto a corresponding pixel, and when viewed in a cross-section of the nano-optical micro-lens array, a fill factor denotes a ratio of an area of the nanostructures arranged within a reference circle among the plurality of nanostructures included in one of the plurality of nano-optical micro-lenses, and the reference circle has a pixel size corresponding to the one nano-optical micro-lens as a diameter, the fill factor is greater than or equal to 95%, wherein the plurality of nano-optical micro lenses comprise a first nano-optical micro-lens facing a green filter;

a second nano-optical micro-lens facing a blue filter; and a third nano-optical micro-lens facing a red filter, and wherein a fill factor of the second nano-optical micro-lens is less than a fill factor of the first nano-optical micro-lens or the third nano-optical micro-lens.

* * * * *